US012581120B2

(12) United States Patent
Hsiang

(10) Patent No.: US 12,581,120 B2
(45) Date of Patent: Mar. 17, 2026

(54) METHOD AND APPARATUS FOR SIGNALING TILE AND SLICE PARTITION INFORMATION IN IMAGE AND VIDEO CODING

(71) Applicant: HFI Innovation Inc., Zhubei City (TW)

(72) Inventor: Shih-Ta Hsiang, Hsinchu City (TW)

(73) Assignee: HFI INNOVATION INC., Zhubei City (TW)

( * ) Notice: Subject to any disclaimer, the term of this patent is extended or adjusted under 35 U.S.C. 154(b) by 46 days.

(21) Appl. No.: 17/906,670

(22) PCT Filed: Mar. 18, 2021

(86) PCT No.: PCT/CN2021/081528
§ 371 (c)(1),
(2) Date: Sep. 19, 2022

(87) PCT Pub. No.: WO2021/185311
PCT Pub. Date: Sep. 23, 2021

(65) Prior Publication Data
US 2023/0139792 A1     May 4, 2023

Related U.S. Application Data

(60) Provisional application No. 62/992,236, filed on Mar. 20, 2020, provisional application No. 62/992,238, (Continued)

(51) Int. Cl.
*H04N 19/70*          (2014.01)
*H04N 19/172*        (2014.01)
(Continued)

(52) U.S. Cl.
CPC ........... *H04N 19/70* (2014.11); *H04N 19/172* (2014.11); *H04N 19/174* (2014.11); *H04N 19/82* (2014.11)

(58) Field of Classification Search
None
See application file for complete search history.

(56) References Cited

U.S. PATENT DOCUMENTS 9,036,697 B2     5/2015  Esenlik et al.
9,247,258 B2     1/2016  Coban et al.
(Continued)

FOREIGN PATENT DOCUMENTS

CN     103947207 A     7/2014
CN     103947213 A     7/2014
(Continued)

OTHER PUBLICATIONS

TW Office Action dated May 10, 2022 in Taiwan application No. 110109964.
(Continued)

*Primary Examiner* — Xiaolan Xu
(74) *Attorney, Agent, or Firm* — McClure, Qualey & Rodack, LLP

(57) ABSTRACT

A method and apparatus for signaling or parsing picture partition information are disclosed. According to one method, a syntax related to a number of tiles in a target slice is signaled at an encoder side or parsed at a decoder side if the address of the target slice does not correspond to a last tile index of the current picture and the raster-scan slice mode is used for picture partition. The syntax is signaled or parsed from a slice header level of the video bitstream corresponding to the target slice. According to another method, a control syntax is signaled at an encoder side or parsed at a decoder side only if the picture partition infor- (Continued)

mation indicates more than one tile existing in the current picture. The control syntax indicates whether in-loop filtering is applied across tile boundaries.

4 Claims, 4 Drawing Sheets

Related U.S. Application Data filed on Mar. 20, 2020, provisional application No. 62/992,239, filed on Mar. 20, 2020, provisional application No. 63/003,360, filed on Apr. 1, 2020, provisional application No. 63/003,366, filed on Apr. 1, 2020.

(51) Int. Cl.
H04N 19/174 (2014.01)
H04N 19/82 (2014.01)

(56) References Cited

U.S. PATENT DOCUMENTS

| | | |
|---|---|---|
| 9,584,819 B2 | 2/2017 | Wang et al. |
| 10,104,386 B2 | 10/2018 | Suehring et al. |
| 10,225,567 B2 | 3/2019 | Yamamoto et al. |
| 10,257,522 B2 | 4/2019 | Sato |
| 10,390,087 B2 | 8/2019 | Ramasubramonian et al. |

| | | | | |
|---|---|---|---|---|
| 2013/0107973 A1* | 5/2013 | Wang | .................... | H04N 19/82 |
| | | | | 375/E7.193 |
| 2016/0080753 A1 | 3/2016 | Oh | | |
| 2018/0167610 A1* | 6/2018 | Park | ...................... | H04N 19/46 |
| 2018/0367796 A1 | 12/2018 | Hendry et al. | | |
| 2022/0210422 A1* | 6/2022 | Esenlik | ................ | H04N 19/119 |
| 2023/0027997 A1* | 1/2023 | Deshpande | .......... | H04N 19/167 |

FOREIGN PATENT DOCUMENTS

| | | |
|---|---|---|
| CN | 105144720 A | 12/2015 |
| CN | 105580370 A | 5/2016 |
| CN | 106464936 A | 2/2017 |
| CN | 103975596 B | 6/2017 |
| WO | 2014002619 A1 | 1/2014 |
| WO | 2019189890 A1 | 10/2019 |
| WO | 2021/170132 A1 | 9/2021 |

OTHER PUBLICATIONS

Bross, B. et al.; "Versatile Video Coding (Draft 8)" (published on Jan. 17, 2020).
International Search Report and Written Opinion dated Jun. 17, 2021, issued in application No. PCT/CN2021/081528.
Extended European Search Report dated Apr. 10, 2024, issued in application No. EP 21771404.7.
Partial Supplementary European Search Report dated Jan. 24, 2024, issued in application No. EP 21771404.7.

* cited by examiner

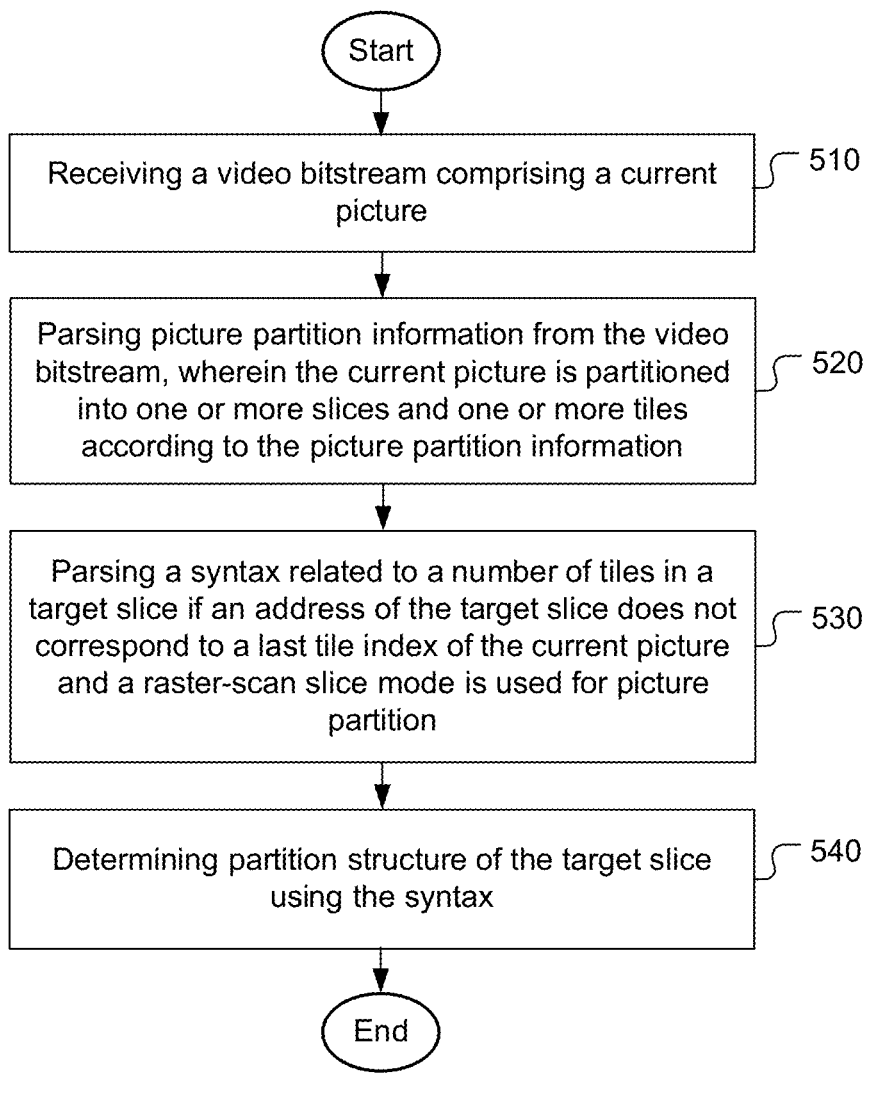

Start

Receiving a video bitstream comprising a current picture ⌒ 510

Parsing picture partition information from the video bitstream, wherein the current picture is partitioned into one or more slices and one or more tiles according to the picture partition information ⌒ 520

Parsing a syntax related to a number of tiles in a target slice if an address of the target slice does not correspond to a last tile index of the current picture and a raster-scan slice mode is used for picture partition ⌒ 530

Determining partition structure of the target slice using the syntax ⌒ 540

End

*Fig. 5*

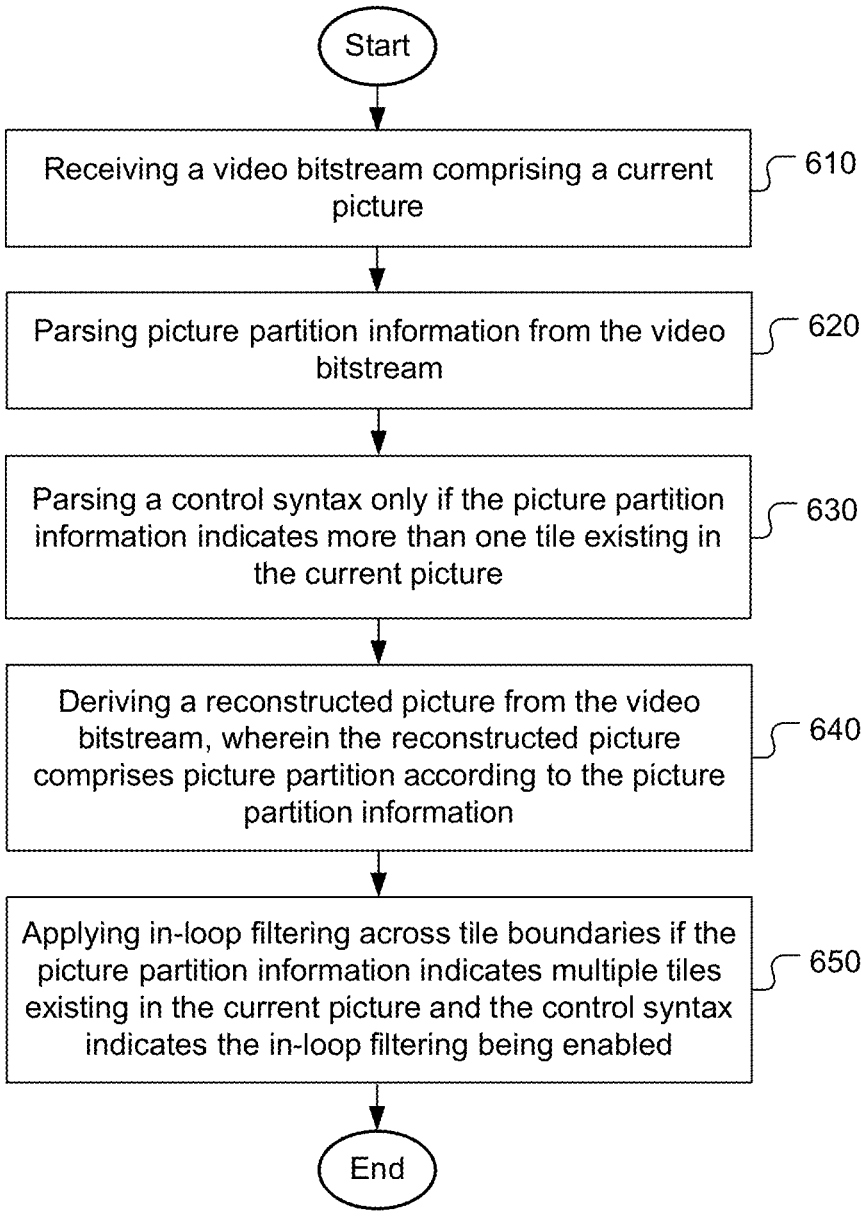

Start

Receiving a video bitstream comprising a current picture    ⌡⌐ 610

Parsing picture partition information from the video bitstream    ⌡⌐ 620

Parsing a control syntax only if the picture partition information indicates more than one tile existing in the current picture    ⌡⌐ 630

Deriving a reconstructed picture from the video bitstream, wherein the reconstructed picture comprises picture partition according to the picture partition information    ⌡⌐ 640

Applying in-loop filtering across tile boundaries if the picture partition information indicates multiple tiles existing in the current picture and the control syntax indicates the in-loop filtering being enabled    ⌡⌐ 650

End

*Fig. 6*

METHOD AND APPARATUS FOR SIGNALING TILE AND SLICE PARTITION INFORMATION IN IMAGE AND VIDEO CODING

CROSS REFERENCE TO RELATED APPLICATIONS

The present invention claims priority to U.S. Provisional Patent Application Ser. No. 62/992,236, filed Mar. 20, 2020, U.S. Provisional Patent Application Ser. No. 62/992,238, filed Mar. 20, 2020, U.S. Provisional Patent Application Ser. No. 62/992,239, filed Mar. 20, 2020, U.S. Provisional Patent Application Ser. No. 63/003,360, filed Apr. 1, 2020 and U.S. Provisional Patent Application Ser. No. 63/003,366, filed Apr. 1, 2020. The U.S. Provisional patent applications are hereby incorporated by reference in their entireties.

FIELD OF THE INVENTION

The present invention relates to picture partition in a video coding system. In particular, the present invention relates to signaling partition information associated with partitioning a picture into slices and tiles.

BACKGROUND OF THE INVENTION

High-efficiency video coding (HEVC) is the latest international video coding standard developed by the Joint Collaborative Team on Video Coding (JCT-VC) (Rec. ITU-T H.265|ISO/IEC 23008-2 version 3: High Efficiency Video Coding, April, 2015). FIG. 1 provides the block diagram of the HEVC encoding system. The input video signal is predicted from the reconstructed signal (136), which is derived from the coded picture regions using Inter/Intra prediction (110). The prediction residual signal is processed by a linear transform (118). The transform coefficients are quantized (120) and entropy coded (122) together with other side information in the bitstream. The reconstructed signal (128) is generated from the prediction signal and the reconstructed residual signal after inverse transform (126) on the de-quantized transform coefficients (124). The reconstructed signal is further processed by in-loop filtering (e.g., de-blocking filter (DF) 130 and NDFs 131) for removing coding artifacts. The decoded pictures are stored in the frame buffer (134) for predicting the future pictures in the input video signal.

In HEVC, a coded picture is partitioned into non-overlapped square block regions represented by the associated coding tree units (CTUs). A coded picture can be represented by a collection of slices, each comprising an integer number of CTUs. The individual CTUs in a slice are processed in a raster scanning order. A bi-predictive (B) slice may be decoded using intra prediction or inter prediction using at most two motion vectors and reference indices to predict the sample values of each block. A predictive (P) slice is decoded using intra prediction or inter prediction using at most one motion vector and reference index to predict the sample values of each block. An intra (I) slice is decoded using intra prediction only.

A CTU can be partitioned into multiple non-overlapped coding units (CUs) using the recursive quadtree (QT) structure to adapt to various local motion and texture characteristics. One or more prediction units (PU) are specified for each CU. The prediction unit, together with the associated CU syntax, works as a basic unit for signaling the predictor information. The specified prediction process is employed to predict the values of the associated pixel samples inside the PU. A CU can be further partitioned using the residual quadtree (RQT) structure for representing the associated prediction residual signal. The leaf nodes of the RQT correspond to the transform units (TUs). A transform unit is comprised of a transform block (TB) of luma samples of size 8×8, 16×16, or 32×32 or four transform blocks of luma samples of size 4×4, and two corresponding transform blocks of chroma samples of a picture in 4:2:0 color format. An integer transform is applied to a transform block and the level values of quantized coefficients together with other side information are entropy coded in the bitstream. FIG. 2 illustrates an example of the block partitioning 210 (left) and its corresponding QT representation 220 (right). The solid lines indicate the CU boundaries and the dashed lines indicate the TU boundaries.

The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

The Joint Video Experts Team (WET) of ITU-T SG16 WP3 and ISO/IEC JTC1/SC29/WG11 is currently in the process of establishing the next-generation video coding standard. Some promising new coding tools have been adopted into Versatile Video Coding (VVC) Draft in JVET-Q2001 (B. Bross J. Chen, S. Liu, "Versatile Video Coding (Draft 8)," Document of Joint Video Experts Team of ITU-T SG16 WP3 and ISO/IEC JTC1/SC29/WG11, JVET-Q2001, 17th Meeting: Brussels, BE, 7-17 Jan. 2020). In VVC Draft as specified in JVET-Q2001, a coded picture is partitioned into non-overlapped square block regions represented by CTUs, similar to HEVC. Each CTU can be partitioned into one or multiple smaller size coding units (CUs) by a quadtree with nested multi-type tree using binary and ternary split. The resulting CU partitions can be in square or rectangular shapes.

SUMMARY OF THE INVENTION

A method and apparatus for signaling or parsing picture partition information are disclosed. According to one method, a syntax related to a number of tiles in a target slice is signaled at an encoder side or parsed at a decoder side if the address of the target slice does not correspond to a last tile index of the current picture and the raster-scan slice mode is used for picture partition. The syntax is signaled or parsed from a slice header level of the video bitstream corresponding to the target slice.

According to another method, a control syntax is signaled at an encoder side or parsed at a decoder side only if the picture partition information indicates more than one tile existing in the current picture. The control syntax indicates whether in-loop filtering is applied across tile boundaries.

BRIEF DESCRIPTION OF THE DRAWINGS

FIG. 5 illustrates a flowchart of an exemplary video decoding system according to an embodiment of the present invention, where a syntax related to a number of tiles in a target slice is parsed if the address of the target slice does not correspond to a last tile index of the current picture and the raster-scan slice mode is used for picture partition.

FIG. 6 illustrates a flowchart of another exemplary video decoding system according to an embodiment of the present invention, where a control syntax is parsed only if the picture partition information indicates more than one tile existing in the current picture. The control syntax indicates whether in-loop filtering is applied across tile boundaries.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
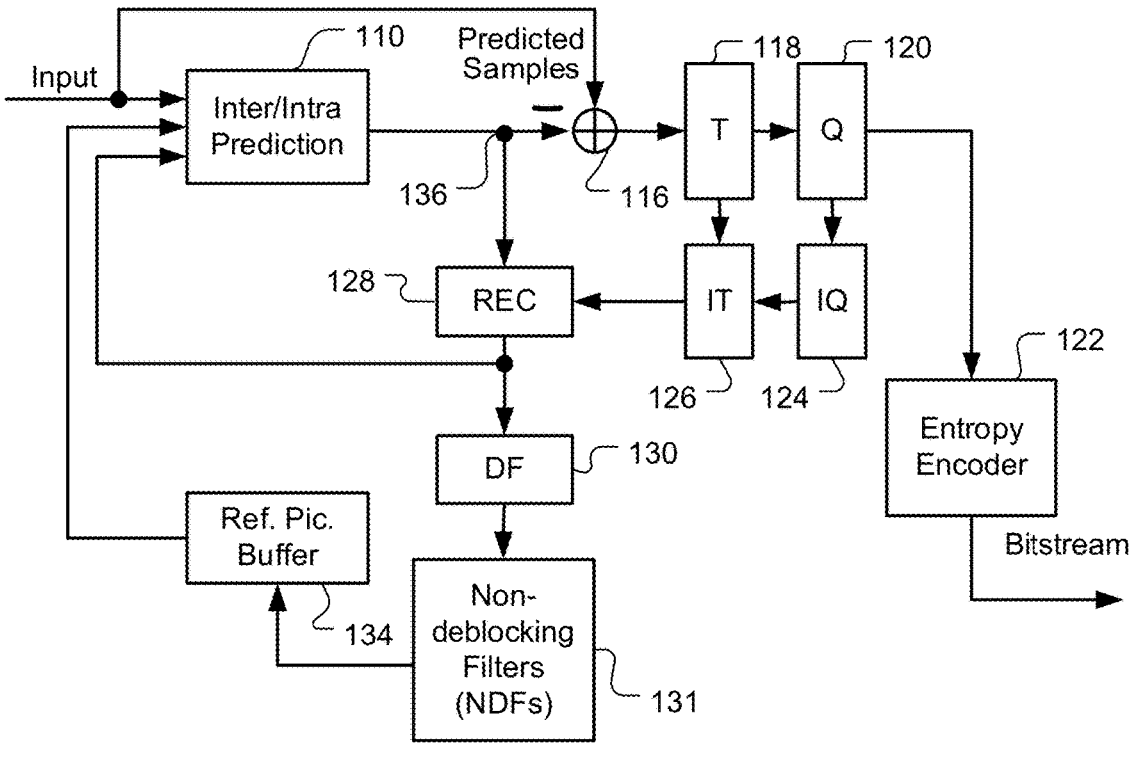
FIG. 1 illustrates an exemplary adaptive inter/intra video encoding system.
Figure 2:
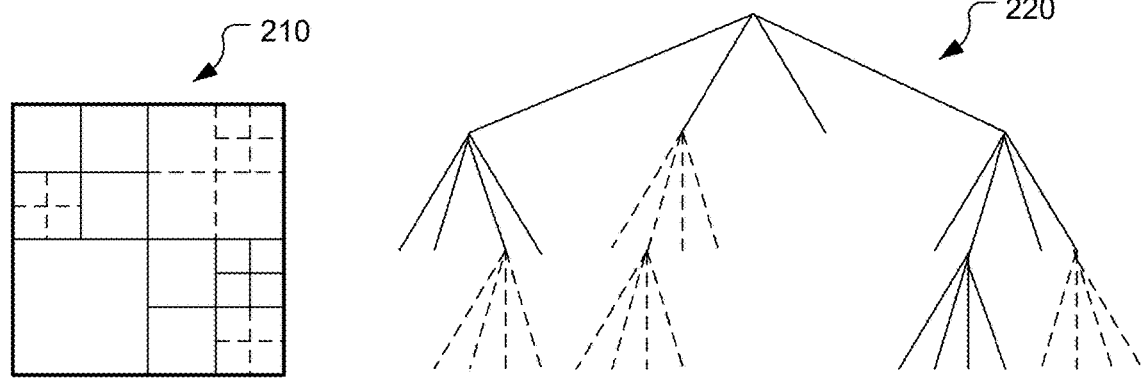
FIG. 2 illustrates an example of block partition, where a block partitioned result is shown on the left and a coding tree (also referred to as a partition tree structure) is shown on the right.
Figure 3:
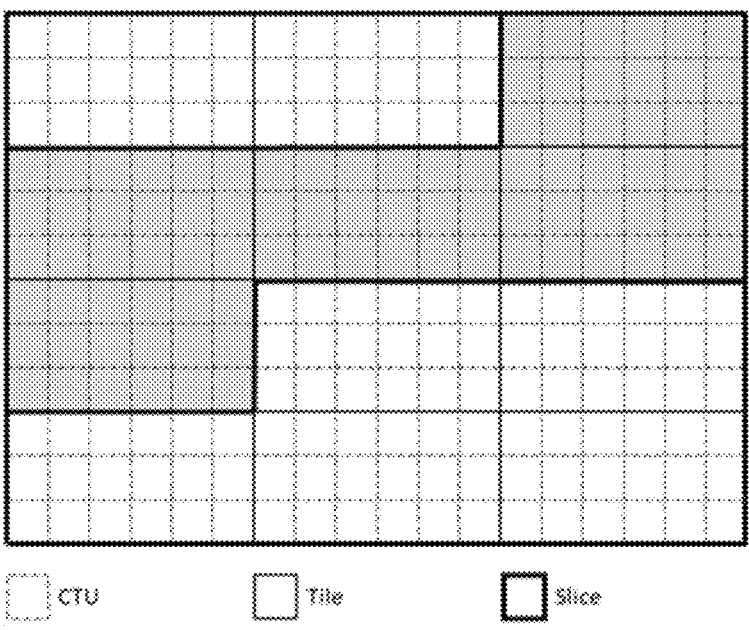
FIG. 3 illustrates an example of partitioning a picture into tiles and slices in the raster-scan slice mode, where the picture with 18 by 12 luma CTUs is partitioned into 12 tiles and 3 raster-scan slices.
Figure 4:
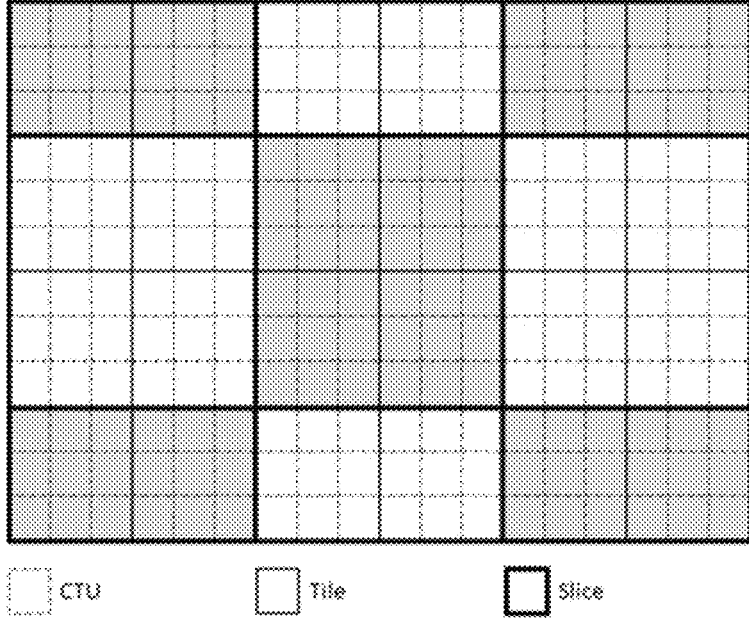
FIG. 4 illustrates an example of partitioning a picture into tiles and slices in the rectangular slice mode, where the picture with 18 by 12 luma CTUs is partitioned into 24 tiles and 9 rectangular slices.

In the Versatile Video Coding (VVC) Draft as specified in JVET-Q2001, a tile is a sequence of CTUs that covers a rectangular region of a picture. The CTUs in a tile are scanned in raster scan order within that tile. A picture is divided into one or more tile rows and one or more tile columns. A slice consists of an integer number of complete tiles or an integer number of consecutive complete CTU rows within a tile of a picture. Two modes of slices are supported, namely the raster-scan slice mode and the rectangular slice mode, as indicated by the syntax element rect_slice_flag. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice. FIG. 3 and FIG. 4 provide examples of partitioning a picture into tiles and slices in raster-scan slice mode and rectangular slice mode, respectively. FIG. 3 illustrates an example where a picture with 18 by 12 luma CTUs is partitioned into 12 tiles and 3 raster-scan slices. Each CTU is indicated by a small rectangle enclosed by dashed lines, each tile is indicated by solid thin lines, and each slice is indicated by a gray area enclosed by thick lines. FIG. 4 illustrates an example where a picture with 18 by 12 luma CTUs is partitioned into 24 tiles and 9 rectangular slices. The syntax element slice_address specifies the raster scan tile index of the first tile in the slice. The value of the syntax element num_tiles_in_slice_minus1 plus 1 specifies the number of the consecutive tiles in a current slice.

The present disclosure reveals the modified method for partitioning of a picture into slices in an image or video coding system. According to one aspects of the present disclosure, a video coder in the raster-scan slice mode shall further support the slice that contains a number of consecutive complete CTU rows within one tile of a picture. In this way, the video coder may further divide each tile in a current picture into more than one slice when the picture is coded in the raster-scan slice mode. The proposed method of signaling the partitioning of a picture into one or more slices first comprises signaling information for deriving the partitioning of the picture into one or more tile rows and one or more tile columns, and each tile is a sequence of CTUs covering a rectangular region of a picture. The method further comprises grouping one or more consecutive complete tiles in a tile raster scan order or one or more consecutive complete CTU rows within a tile into the individual slice in the picture. The method further comprises signaling information for determining whether the current slice contains one or more consecutive complete tiles or contains one or more consecutive complete CTU rows within a tile. In one embodiment, when it is signaled that the current slice is entirely contained in one tile, a syntax flag is further signaled to indicate whether the current slice contains a complete tile. The method further comprises signaling information for deriving the position of the current slice and the number of consecutive tiles or CTU rows contained in the current slice for each of the slices in the picture. The method may further comprise signaling information to indicate that the slices in the picture are coded according to the raster-scan slice mode or the rectangular slice mode.

In some embodiments, the position of the current slice in the picture may be signaled by coding the raster scan tile index of the first tile in the current slice. When the picture contains only one tile, coding the raster scan tile index of the first tile in the current slice is skipped and the raster scan tile index is inferred to be equal to 0. When the tile index of the first tile in the current slice is equal to the last tile index in the picture, the method may skip signaling information for deriving the number of the tiles in the current slice and the number of the tiles in the current slice is inferred to be equal to 1. When the current slice is entirely contained within one tile, in some embodiments, the position of the current slice may be signaled by coding information for deriving the raster scan tile index of the associated tile and the first CTU row index of the current slice within the associated tile. The coding system may have a requirement of bitstream conformance that the pair of the tile index value and the first CTU row index value of the current slice shall not be the same as the pair of the tile index value and the first CTU row index value of any other slices in the same coded picture. In one embodiment, a video coder may signal the number of CTU rows in the current slice before signaling the first CTU row index of the current slice. When the number of tile CTU rows in the current slice is equal to the row height of the associated tile, the video coder may skip coding information for deriving the first CTU row index of the current slice and infer the first CTU row index of the current slice within the associated tile to be equal to 0. In another embodiment, a video coder may signal the first CTU row index of the current slice within the associated tile before signaling the number of tile CTU rows in the current slice. When the first CTU row index of the current slice is equal to the last CTU row index within the tile, the video coder may skip coding information for deriving the number of CTU rows in the current slice and the number of CTU rows in the current slice is inferred to be equal to 1.

In some embodiments, video coders based on VVC Draft as specified in JVET-Q2001JVET-Q2001 are modified according to the proposed method. In Embodiment A, when the syntax element rect_slice_flag is equal to 0 and the syntax element num_tiles_in_slice_minus1 is equal to 0, it indicates that the current slice is coded in the raster-scan slice mode, the number of the tiles in the coded slice is equal to 1 and the current slice is entirely contained in one tile. A new syntax element num_rows_in_slice is further signaled for deriving the number of the CTU rows in the current slice. num_rows_in_slice equal to 0 indicate that the current slice contains all CTU rows within the associated tile with the raster scan tile index slice_address. When num_rows_in_slice is greater than 0, it specifies the number of consecutive complete CTU rows within the associated tile in the current slice. When num_rows_in_slice is greater than 0, a new syntax element tile_row_id is further signaled for specifying the first CTU row index of the current slice in the associated tile. When num_rows_in_slice is equal to 0, tile_row_id may be inferred to be equal to 0 and is not explicitly signaled. When the associated tile contains only one CTU row, both num_rows_in_slice and tile_row_id may be inferred to be equal to 0 and are not explicitly signaled. The modified syntax table based on JVET-Q2001 according to the proposed method for Embodiment A is provided in Table 1.

Otherwise (rect_slice_flag is equal to 1), the following applies:
  The slice address is the subpicture-level slice index of the slice.
  The length of slice_address is Ceil(Log 2(NumSlicesInSubpic[CurrSubpicIdx])) bits.
  The value of slice_address shall be in the range of 0 to NumSlicesInSubpic[CurrSubpicIdx]−1, inclusive.
  sh_extra_bit[i] may be equal to 1 or 0. Decoders conforming to this version of this Specification shall ignore the value of sh_extra_bit[i]. Its value does not affect decoder conformance to profiles specified in this version of specification.
  num_tiles_in_slice_minus1 plus 1 specifies the number of tiles in the slice when rect_slice_flag is equal to 0. The value of num_tiles_in_slice_minus1 shall be in the range of 0 to NumTilesInPic−1−slice_address, inclusive. When rect_slice_flag is equal to 0 and num_tiles_in_slice_minus1 is not present, the value of num_tiles_in_slice_minus1 is inferred to be equal to 0.
  num_rows_in_slice equal to 0 specifies that the number of consecutive complete CTU rows within the tile with the

TABLE 1

The modified syntax table based on JVET-Q2001 according to Embodiment A

| | Descriptor |
| --- | --- |
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1 ) \|\| | |
|     ( !rect_slice_flag && NumTilesInPic > 1 ) ) | |
|     slice_address | u(v) |
|   for( i = 0; i < NumExtraShBits; i++ ) | |
|     sh_extra_bit[ i ] | u(1) |
|   if( !rect_slice_flag ) { | |
|     if( slice_address < NumTilesInPic − 1 ) | |
|       num_tiles_in_slice_minus1 | ue(v) |
|     if( num_tiles_in_slice_minus1 = = 0 && !no_pic_partition_flag && | |
|       RowHeight[ slice_address / NumTileColumns ] > 1 ) { | |
|       num_rows_in_slice | u(v) |
|      if( num_rows_in_slice ) | |
|        tile_row_id | ue(v) |
|     } | |
|   } | |
|   .... | |
| } | |

The related semantics are as follows:
  slice_subpic_id specifies the subpicture ID of the subpicture that contains the slice. If slice_subpic_id is present, the value of the variable CurrSubpicIdx is derived to be such that SubpicIdVal[CurrSubpicIdx] is equal to slice_subpic_id. Otherwise (slice_subpic_id is not present), slice_subpic_id is inferred to be equal to SubpicIdVal[0] and CurrSubpicIdx is derived to be equal to 0. The length of slice_subpic_id is sps_subpic_id_len_minus1+1 bits.
  slice_address specifies the slice address of the slice. When not present, the value of slice_address is inferred to be equal to 0.
  If rect_slice_flag is equal to 0, the following applies:
  The slice address is the raster scan tile index of the first tile in the slice.
  The length of slice_address is Ceil(Log 2 (NumTilesInPic)) bits.
  The value of slice_address shall be in the range of 0 to NumTilesInPic−1, inclusive.

raster scan tile index slice_address in the slice is equal to RowHeight[slice_address/NumTileColumns] when num_tiles_in_slice_minus1 is equal to 0. When num_tiles_in_slice_minus1 is equal to 0 and num_rows_in_slice is greater than 0, num_rows_in_slice specifies the number of consecutive complete CTU rows within the tile with the raster scan tile index slice_address in the slice. The value of num_rows_in_slice shall be in the range of 0 to RowHeight[slice_address/NumTileColumns]−1. When num_tiles_in_slice_minus1 is equal to 0 and num_rows_in_slice is not present, the value of num_rows_in_slice is inferred to be equal to 0.
  tile_row_id specifies the first CTU row index of the slice within the tile with the raster scan tile index slice_address. The length of tile_row_id is Ceil(Log 2 (RowHeight[slice_address/NumTileColumns])) bits. The value of tile_row_id shall be in the range of 0 to RowHeight[slice_address/NumTileColumns]−1. When rect_slice_flag is equal to 0 and tile_row_id is not present, the value of tile_row_id is inferred to be equal to 0.

It is a requirement of bitstream conformance that the following constraints apply:

If rect_slice_flag is equal to 0, the pair of slice_address and tile_row_id values shall not be equal to the pair of slice_address and tile_row_id values of any other coded slice NAL unit of the same coded picture.

Otherwise, the pair of slice_subpic_id and slice_address values shall not be equal to the pair of slice_subpic_id and slice_address values of any other coded slice NAL unit of the same coded picture.

The shapes of the slices of a picture shall be such that each CTU, when decoded, shall have its entire left boundary and entire top boundary consisting of a picture boundary or consisting of boundaries of previously decoded CTU(s).

The variable NumCtusInCurrSlice, which specifies the number of CTUs in the current slice, and the list CtbAddrInCurrSlice[i], for i ranging from 0 to NumCtusInCurrSlice−1, inclusive, specifying the picture raster scan address of the i-th CTB within the slice, are derived as follows:

```
if( rect_slice_flag ) {
    picLevelSliceIdx = slice_address
    for( j = 0; j < CurrSubpicIdx; j++ )
        picLevelSliceIdx += NumSlicesInSubpic[ j ]
    NumCtusInCurrSlice = NumCtusInSlice[ picLevelSliceIdx ]
    for( i = 0; i < NumCtusInCurrSlice; i++ )
        CtbAddrInCurrSlice[ i ] = CtbAddrInSlice[ picLevelSliceIdx ][ i ]
} else {
    NumCtusInCurrSlice = 0
    if( num_rows_in_slice ) {
    tileIdx = slice_address
    tileX = tileIdx % NumTileColumns
    tileY = tileIdx / NumTileColumns
    for( i = 0, ctbY = tileRowBd[ tileY ] + tile_row_id; i <
    num_rows_in_slice; ctbY++, i++ ) {
        for( ctbX = tileColBd[ tileX ]; ctbX < tileColBd[ tileX + 1 ];
        ctbX++ ) {
            CtbAddrInCurrSlice [ NumCtusInCurrSlice ] = ctbY *
            PicWidthInCtb + ctbX
            NumCtusInCurrSlice++
        }
    }
}
```

-continued

```
    } else {
    for( tileIdx = slice_address; tileIdx <= slice_address +
    num_tiles_in_slice_minus1; tileIdx++ ) {
        tileX = tileIdx % NumTileColumns
        tileY = tileIdx / NumTileColumns
        for( ctbY = tileRowBd[ tileY ]; ctbY < tileRowBd[ tileY + 1 ];
        ctbY++ ) {
            for( ctbX = tileColBd[ tileX ]; ctbX < tileColBd[ tileX + 1 ];
            ctbX++ ) {
                CtbAddrInCurrSlice[ NumCtusInCurrSlice ] = ctbY *
                PicWidthInCtb + ctbX
                NumCtusInCurrSlice++
            }
        }
    }
    }
}
```

In Embodiment B, when the syntax element rect_slice_flag is equal to 0 and the syntax element num_tiles_in_slice_minus1 is equal to 0, it indicates that the current slice is coded in the raster-scan slice mode, the number of the tiles in the coded slice is equal to 1 and the current slice is entirely contained in one tile. A new syntax element tile_row_id is further signaled for specifying the first CTU row index of the current slice in the associated tile. Another new syntax element num_rows_in_slice is further signaled for deriving the number of the CTU rows in the current slice. num_rows_in_slice equal to 0 indicates that the current slice contains all remaining CTU rows starting from the CTU row index tile_row_id within the associated tile with the raster scan tile index slice_address. When num_rows_in_slice is greater than 0, it specifies the number of consecutive complete CTU rows within the associated tile in the current slice. When tile_row_id is equal to the last tile index of the associated tile, num_rows_in_slice is inferred to be equal to 0 and is not explicitly signaled. When the associated tile contains only one CTU row, both num_rows_in_slice and tile_row_id may be inferred to be equal to 0 and are not explicitly signaled. The modified syntax table based on JVET-Q2001 according to the proposed method for Embodiment B is provided in Table 2.

TABLE 2

| The modified syntax table based on JVET-Q2001 according to Embodiment B | Descriptor |
|---|---|
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1 ) \|\| | |
|     ( !rect_slice_flag && NumTilesInPic > 1 ) ) | |
|     slice_address | u(v) |
|   for( i = 0; i < NumExtraShBits; i++ ) | |
|     sh_extra_bit[ i ] | u(1) |
|   if( !rect_slice_flag ) { | |
|     if( slice_address < NumTilesInPic − 1 ) | |
|       num_tiles_in_slice_minus1 | ue(v) |
|     if( num_tiles_in_slice_minus1 = = 0 && !no_pic_partition_flag && | |
|       RowHeight[ slice_address / NumTileColumns ] > 1) { | |

TABLE 2-continued

The modified syntax table based on JVET-Q2001 according to Embodiment B

| | Descriptor |
|---|---|
| tile_row_id | u(v) |
| if( tile_row_id < RowHeight[ slice_address / NumTileColumns ] − 1 ) | |
|     num_rows_in_slice | ue(v) |
|   } | |
| } | |
| ... | |
| } | |

The related semantics are as follows:

slice_subpic_id specifies the subpicture ID of the subpicture that contains the slice. If slice_subpic_id is present, the value of the variable CurrSubpicIdx is derived to be such that SubpicIdVal[CurrSubpicIdx] is equal to slice_subpic_id. Otherwise (slice_subpic_id is not present), slice_subpic_id is inferred to be equal to SubpicIdVal[0] and CurrSubpicIdx is derived to be equal to 0. The length of slice_subpic_id is sps_subpic_id_len_minus1+1 bits.

slice_address specifies the slice address of the slice. When not present, the value of slice_address is inferred to be equal to 0.

If rect_slice_flag is equal to 0, the following applies:

The slice address is the raster scan tile index of the first tile in the slice.

The length of slice_address is Ceil(Log 2 (NumTilesInPic)) bits.

The value of slice_address shall be in the range of 0 to NumTilesInPic−1, inclusive.

Otherwise (rect_slice_flag is equal to 1), the following applies:

The slice address is the subpicture-level slice index of the slice.

The length of slice_address is Ceil(Log 2(NumSlicesInSubpic[CurrSubpicIdx])) bits.

The value of slice_address shall be in the range of 0 to NumSlicesInSubpic[CurrSubpicIdx]−1, inclusive.

sh_extra_bit[i] may be equal to 1 or 0. Decoders conforming to this version of this Specification shall ignore the value of sh_extra_bit[i]. Its value does not affect decoder conformance to profiles specified in this version of specification.

num_tiles_in_slice_minus1 plus 1 specifies the number of tiles in the slice when rect_slice_flag is equal to 0. The value of num_tiles_in_slice_minus1 shall be in the range of 0 to NumTilesInPic−1−slice_address, inclusive. When rect_slice_flag is equal to 0 and num_tiles_in_slice_minus1 is not present, the value of num_tiles_in_slice_minus1 is inferred to be equal to 0.

tile_row_id specifies the first CTU row index of the slice within the tile with the tile index specified by slice_address. The length of tile_row_id is Ceil(Log 2 (RowHeight [slice_address/NumTileColumns])) bits. The value of tile_row_id shall be in the range of 0 to RowHeight [slice_address/NumTileColumns]−1. When rect_slice_flag is equal to 0 and tile_row_id is not present, the value of tile_row_id is inferred to be equal to 0.

It is a requirement of bitstream conformance that the following constraints apply:

If rect_slice_flag is equal to 0, the pair of slice_address and tile_row_id values shall not be equal to the pair of slice_address and tile_row_id values of any other coded slice NAL unit of the same coded picture.

Otherwise, the pair of slice_subpic_id and slice_address values shall not be equal to the pair of slice_subpic_id and slice_address values of any other coded slice NAL unit of the same coded picture.

The shapes of the slices of a picture shall be such that each CTU, when decoded, shall have its entire left boundary and entire top boundary consisting of a picture boundary or consisting of boundaries of previously decoded CTU(s).

num_rows_in_slice equal to 0 specifies that the number of consecutive complete CTU rows within the tile with the raster scan tile index slice_address in the slice is equal to RowHeight[slice_address/NumTileColumns]−tile_row_id when num_tiles_in_slice_minus1 is equal to 0. When num_tiles_in_slice_minus1 is equal to 0 and num_rows_in_slice is greater than 0, num_rows_in_slice specifies the number of consecutive complete CTU rows within the tile with the raster scan tile index slice_address in the slice. The value of num_rows_in_slice shall be in the range of 0 to RowHeight[slice_address/NumTileColumns]−tile_row_id−1. When num_tiles_in_slice_minus1 is equal to 0 and num_rows_in_slice is not present, the value of num_rows_in_slice is inferred to be equal to 0.

The variable NumCtusInCurrSlice, which specifies the number of CTUs in the current slice, and the list CtbAddrInCurrSlice[i], for i ranging from 0 to NumCtusInCurrSlice−1, inclusive, specifying the picture raster scan address of the i-th CTB within the slice, are derived as follows:

```
if( rect_slice_flag ) {
    picLevelSliceIdx = slice_address
    for( j = 0; j < CurrSubpicIdx; j++ )
      picLevelSliceIdx += NumSlicesInSubpic[ j ]
    NumCtusInCurrSlice = NumCtusInSlice[ picLevelSliceIdx ]
    for( i = 0; i < NumCtusInCurrSlice; i++ )
      CtbAddrInCurrSlice[ i ] = CtbAddrInSlice[ picLevelSliceIdx ][ i ]
} else {
    NumCtusInCurrSlice = 0
  if( tile_row_id || num_rows_in_slice ) {
    tileIdx = slice_address
    tileX = tileIdx % NumTileColumns
    tileY = tileIdx / NumTileColumns
    numRowsInSlice = num_rows_in_slice? num_rows_in_slice :
      ( RowHeight[ slice_address / NumTileColumns ]. −
        tile_row_id )
for( i = 0, ctbY = tileRowBd[ tileY ] + tile_row_id; i <
numRowsInSlice; ctbY++, i++ ) {
      for( ctbX = tileColBd[ tileX ]; ctbX < tileColBd[ tileX + 1 ];
      ctbX++ ) {
        CtbAddrInCurrSlice[ NumCtusInCurrSlice ] = ctbY *
        PicWidthInCtb + ctbX
        NumCtusInCurrSlice++
      }
    }
  } else {
    for( tileIdx = slice_address; tileIdx <= slice_address +
    num_tiles_in_slice_minus1;
```

-continued

```
tileIdx++ ) {
      tileX = tileIdx % NumTileColumns
      tileY = tileIdx / NumTileColumns
      for( ctbY = tileRowBd[ tileY ]; ctbY < tileRowBd[ tileY + 1 ];
      ctbY++ ) {
         for( ctbX = tileColBd[ tileX ]; ctbX < tileColBd[ tileX + 1 ];
         ctbX++ ) {
            CtbAddrInCurrSlice[ NumCtusInCurrSlice ] = ctbY *
            PicWidthInCtb + ctbX
            NumCtusInCurrSlice++
         }
      }
   }
  }
}
```

In Embodiment C, when the syntax element rect_slice_flag is equal to 0 and the syntax element num_tiles_in_slice_minus1 is equal to 0, it indicates that the current slice is coded in the raster-scan slice mode, the number of the tiles in the coded slice is equal to 1, the current slice is entirely contained in one tile, and a new syntax element part_tile_in_slice_flag is further signaled. part_tile_in_slice_flag equal to 1 specifies that the new syntax elements tile_row_id and num_rows_in_slice_minus1 follow next in the slice header. tile_row_id specifies the first CTU row index of the current slice in the associated tile with the raster scan tile index equal to slice_address. num_rows_in_slice_minus1 plus 1 specifies the number of the CTU rows in the current slice. When tile_row_id is equal to the last tile index of the associated tile, num_rows_in_slice_minus1 is inferred to be equal to 0 and is not explicitly signaled. part_tile_in_slice_flag equal to 0 specifies that the current slice contains a number of consecutive complete tiles. When the associated tile contains only one CTU row, part_tile_in_slice_flag, num_rows_in_slice and tile_row_id may be inferred to be equal to 0 and are not explicitly signaled. The modified syntax table based on JVET-Q2001 according to the proposed method for Embodiment C is provided in Table 3.

The related semantics are as follows:

slice_subpic_id specifies the subpicture ID of the subpicture that contains the slice. If slice_subpic_id is present, the value of the variable CurrSubpicIdx is derived to be such that SubpicIdVal[CurrSubpicIdx] is equal to slice_subpic_id. Otherwise (slice_subpic_id is not present), slice_subpic_id is inferred to be equal to SubpicIdVal[0] and CurrSubpicIdx is derived to be equal to 0. The length of slice_subpic_id is sps_subpic_id_len_minus1+1 bits.

slice_address specifies the slice address of the slice. When not present, the value of slice_address is inferred to be equal to 0.

If rect_slice_flag is equal to 0, the following applies:

The slice address is the raster scan tile index of the first tile in the slice.

The length of slice_address is Ceil(Log 2 (NumTilesInPic)) bits.

The value of slice_address shall be in the range of 0 to NumTilesInPic−1, inclusive.

Otherwise (rect_slice_flag is equal to 1), the following applies:

The slice address is the subpicture-level slice index of the slice.

The length of slice_address is Ceil(Log 2(NumSlicesInSubpic[CurrSubpicIdx])) bits.

The value of slice_address shall be in the range of 0 to NumSlicesInSubpic[CurrSubpicIdx]−1, inclusive.

sh_extra_bit[i] may be equal to 1 or 0. Decoders conforming to this version of this Specification shall ignore the value of sh_extra_bit[i]. Its value does not affect decoder conformance to profiles specified in this version of specification.

num_tiles_in_slice_minus1 plus 1 specifies the number of tiles in the slice when rect_slice_flag is equal to 0. The value of num_tiles_in_slice_minus1 shall be in the range of 0 to NumTilesInPic−1−slice_address, inclusive. When rect_slice_flag is equal to 0 and num_tiles_in_slice_minus1 is not present, the value of num_tiles_in_slice_minus1 is inferred to be equal to 0.

TABLE 3

| The modified syntax table based on JVET-Q2001 according to Embodiment C | |
| --- | --- |
| | Descriptor |
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1 ) \| \| | |
|     ( !rect_slice_flag && NumTilesInPic > 1 ) ) | |
|     slice_address | u(v) |
|   for( i = 0; i < NumExtraShBits; i++ ) | |
|     sh_extra_bit[ i ] | u(1) |
|   if( !rect_slice_flag ) { | |
|     if( slice_address < ( NumTilesInPic − 1) ) | |
|       num_tiles_in_slice_minus1 | ue(v) |
|     if( num_tiles_in_slice_minus1 = = 0 && !no_pic_partition_flag && | |
|       RowHeight[ slice_address / NumTileColumns ] > 1) { | |
|       part_tile_in_slice_flag | |
|       if( part_tile_in_slice_flag ) { | |
|         tile_row_id | u(v) |
|       if( tile_row_id < RowHeight[ slice_address / NumTileColumns ] − 1 ) | |
|         num_rows_in_slice_ minus1 | ue(v) |
|       } | |
|     } | |
|   } | |
|   .... | |
| } | | part_tile_in_slice_flag equal to 1 specifies that the syntax elements tile_row_id and num_rows_in_slice_minus1 follow next in the slice header. part_tile_in_slice_flag equal to 0 specifies that the syntax elements tile_row_id and num_rows_in_slice_minus1 are not present in the slice header. When part_tile_in_slice_flag is not present, it is inferred to be equal to 0.

tile_row_id specifies the first CTU row index of the slice within the tile with the tile index specified by slice_address. The length of tile_row_id is Ceil(Log 2 (RowHeight [slice_address/NumTileColumns])) bits. The value of tile_row_id shall be in the range of 0 to RowHeight [slice_address/NumTileColumns]−1. When rect_slice_flag is equal to 0 and tile_row_id is not present, the value of tile_row_id is inferred to be equal to 0.

It is a requirement of bitstream conformance that the following constraints apply:

If rect_slice_flag is equal to 0, the pair of slice_address and tile_row_id values shall not be equal to the pair of slice_address and tile_row_id values of any other coded slice NAL unit of the same coded picture.

Otherwise, the pair of slice_subpic_id and slice_address values shall not be equal to the pair of slice_subpic_id and slice_address values of any other coded slice NAL unit of the same coded picture.

The shapes of the slices of a picture shall be such that each CTU, when decoded, shall have its entire left boundary and entire top boundary consisting of a picture boundary or consisting of boundaries of previously decoded CTU(s).

num_rows_in_slice_minus1 plus 1 specifies the number of consecutive complete CTU rows within the tile with the raster scan tile index slice_address in the slice when num_tiles_in_slice_minus1 is equal to 0. The value of num_rows_in_slice_minus1 shall be in the range of 0 to Min(RowHeight[slice_address/NumTileColumns]−2, RowHeight[slice_address/NumTileColumns]−1− tile_row_id). When part_tile_in_slice_flag is equal to 1 and num_rows_in_slice_minus1 is not present, the value of num_rows_in_slice_minus1 is inferred to be equal to 0.

The variable NumCtusInCurrSlice, which specifies the number of CTUs in the current slice, and the list CtbAddrInCurrSlice[i], for i ranging from 0 to NumCtusInCurrSlice−1, inclusive, specifying the picture raster scan address of the i-th CTB within the slice, are derived as follows:

```
if( rect_slice_flag ) {
    picLevelSliceIdx = slice_address
    for( j = 0; j < CurrSubpicIdx; j++ )
        picLevelSliceIdx += NumSlicesInSubpic[ j ]
    NumCtusInCurrSlice =NumCtusInSlice[ picLevelSliceIdx ]
    for( i = 0; i < NumCtusInCurrSlice; i++ )
        CtbAddrInCurrSlice[ i ] = CtbAddrInSlice[ picLevelSliceIdx ][ i ]
} else {
    NumCtusInCurrSlice = 0
    if( part_tile_in_slice_flag ) {
        tileIdx = slice_address
        tileX = tileIdx % NumTileColumns
        tileY = tileIdx / NumTileColumns
        for( i = 0, ctbY = tileRowBd[ tileY ] + tile_row_id; i <=
        num_rows_in_slice_minus1; ctbY++,
                i++ ) {
            for( ctbX = tileColBd[ tileX ]; ctbX < tileColBd[ tileX + 1 ];
            ctbX++ ) {
                CtbAddrInCurrSlice[ NumCtusInCurrSlice ] = ctbY *
                PicWidthInCtb + ctbX
                NumCtusInCurrSlice++
            }
        }
    } else {
        for( tileIdx = slice_address; tileIdx <= slice_address +
        num_tiles_in_slice_minus1;
                tileIdx++ ) {
            tileX = tileIdx % NumTileColumns
            tileY = tileIdx / NumTileColumns
            for( ctbY = tileRowBd[ tileY ]; ctbY < tileRowBd[ tileY + 1 ];
            ctbY++ ) {
                for( ctbX = tileColBd[ tileX ]; ctbX < tileColBd[ tileX + 1 ];
                ctbX++ ) {
                    CtbAddrInCurrSlice [ NumCtusInCurrSlice ] = ctbY *
                    PicWidthInCtb + ctbX
                    NumCtusInCurrSlice++
                }
            }
        }
    }
}
```

In Embodiment D, a new syntax element num_tiles_ in_slice, replacing the syntax element num_tiles_in_ slice_minus1 in JVET-Q2001, is coded for signaling information related to the number of the consecutive complete tiles contained in the current slice. num_tiles_in_slice equal to 0 specifies that the new syntax elements tile_row_id and num_rows_in_slice_minus1 follow next in the slice header. tile_row_id specifies the first CTU row index of the current slice in the associated tile with the raster scan tile index equal to slice_address. num_rows_in_slice_minus1 plus 1 specifies the number of the CTU rows in the current slice. When tile_row_id is equal to the last tile index of the associated tile, num_rows_in_slice_minus1 is inferred to be equal to 0 and is not explicitly signaled.

TABLE 4

| The modified syntax table based on JVET-Q2001 according to Embodiment D | Descriptor |
| --- | --- |
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1 ) \| \| | |
|     ( !rect_slice_flag && NumTilesInPic > 1 ) ) | |
|     slice_address | u(v) |
|   for( i = 0; i < NumExtraShBits; i++ ) | |
|     sh_extra_bit[ i ] | u(1) |
|   if( !rect_slice_flag ) { | |

TABLE 4-continued

The modified syntax table based on JVET-Q2001 according to Embodiment D

|  | Descriptor |
|---|---|
| num_tiles_in_slice | ue(v) |
| if( num_tiles_in_slice = = 0 && !no_pic_partition_flag ) { | |
|     tile_row_id | u(v) |
|     if( tile_row_id < RowHeight[ slice_address / NumTileColumns ] − 1 ) | |
|         num_rows_in_slice_ minus1 | ue(v) |
|     } | |
| } | |
| .... | |
| } | |

The related semantics areas follows:

slice_subpic_id specifies the subpicture TD of the subpicture that contains the slice. If slice_subpic_id is present, the value of the variable CurrSubpicIdx is derived to be such that SubpicIdVal[CurrSubpicIdx] is equal to slice_subpic_id. Otherwise (slice_subpic_id is not present), slice_subpic_id is inferred to be equal to SubpicIdVal[0] and CurrSubpicIdx is derived to be equal to 0. The length of slice_subpic_id is sps_subpic_id_len_minus1+1 bits.

slice_address specifies the slice address of the slice. When not present, the value of slice_address is inferred to be equal to 0.

If rect_slice_flag is equal to 0, the following applies:

The slice address is the raster scan tile index of the first tile in the slice.

The length of slice_address is Ceil(Log 2 (NumTilesInPic)) bits.

The value of slice_address shall be in the range of 0 to NumTilesInPic−1, inclusive.

Otherwise (rect_slice_flag is equal to 1), the following applies:

The slice address is the subpicture-level slice index of the slice.

The length of slice_address is Ceil(Log 2(NumSlicesInSubpic[CurrSubpicIdx])) bits.

The value of slice_address shall be in the range of 0 to NumSlicesInSubpic[CurrSubpicIdx]−1, inclusive.

sh_extra_bit[i] may be equal to 1 or 0. Decoders conforming to this version of this Specification shall ignore the value of sh_extra_bit[i]. Its value does not affect decoder conformance to profiles specified in this version of specification.

num_tiles_in_slice specifies the number of complete tiles in the slice when rect_slice_flag is equal to 0. The value of num_tiles_in_slice shall be in the range of 0 to NumTilesInPic−slice_address, inclusive.

tile_row_id specifies the first CTU row index of the slice within the tile with the tile index specified by slice_address. The length of tile_row_id is Ceil(Log 2 (RowHeight [slice_address/NumTileColumns])) bits. The value of tile_row_id shall be in the range of 0 to RowHeight [slice_address/NumTileColumns]−1. When rect_slice_flag is equal to 0 and tile_row_id is not present, the value of tile_row_id is inferred to be equal to 0.

It is a requirement of bitstream conformance that the following constraints apply:

If rect_slice_flag is equal to 0, the pair of slice_address and tile_row_id values shall not be equal to the pair of slice_address and tile_row_id values of any other coded slice NAL unit of the same coded picture.

Otherwise, the pair of slice_subpic_id and slice_address values shall not be equal to the pair of slice_subpic_id and slice_address values of any other coded slice NAL unit of the same coded picture.

The shapes of the slices of a picture shall be such that each CTU, when decoded, shall have its entire left boundary and entire top boundary consisting of a picture boundary or consisting of boundaries of previously decoded CTU(s).

num_rows_in_slice_minus1 plus 1 specifies the number of consecutive complete CTU rows within the tile with the raster scan tile index slice_address in the slice when num_tiles_in_slice_minus1 is equal to 0. The value of num_rows_in_slice_minus1 shall be in the range of 0 to Min(RowHeight[slice_address/NumTileColumns]−2, RowHeight[slice_address/NumTileColumns]−1− tile_row_id). When part_tile_in_slice_flag is equal to 1 and num_rows_in_slice_minus1 is not present, the value of num_rows_in_slice_minus1 is inferred to be equal to 0.

The variable NumCtusInCurrSlice, which specifies the number of CTUs in the current slice, and the list CtbAddrInCurrSlice[i], for i ranging from 0 to NumCtusInCurrSlice−1, inclusive, specifying the picture raster scan address of the i-th CTB within the slice, are derived as follows:

```
if( rect_slice_flag ) {
    picLevelSliceIdx = slice_address
    for( j = 0; j < CurrSubpicIdx; j++ )
        picLevelSliceIdx += NumSlicesInSubpic[ j ]
    NumCtusInCurrSlice = NumCtusInSlice[ picLevelSliceIdx ]
    for( i = 0; i < NumCtusInCurrSlice; i++ )
        CtbAddrInCurrSlice[ i ] = CtbAddrInSlice[ picLevelSliceIdx ][ i ]
} else {
    NumCtusInCurrSlice = 0
    if( num_tiles_in_slice = = 0 ) {
        tileIdx = slice_address
        tileX = tileIdx % NumTile Columns
        tileY = tileIdx / NumTileColumns
        for( i = 0, ctbY = tileRowBd[ tileY ] + tile row id; i <=
            num_rows_in_slice_minus1;
ctbY++, i++ ) {
            for( ctbX = tileColBd[ tileX ]; ctbX < tileColBd[ tileX + 1 ];
            ctbX++ ) {
                CtbAddrInCurrSlice[ NumCtusInCurrSlice ] = ctbY *
                PicWidthInCtb + ctbX
                NumCtusInCurrSlice++
            }
        }
    } else {
        for( tileIdx = slice_address; tileIdx <= slice_address +
            num_tiles_in_slice_minus1;
tileIdx++ ) {
            tileX = tileIdx % NumTileColumns
            tileY = tileIdx / NumTileColumns
            for( ctbY = tileRowBd[ tileY ]; ctbY < tileRowBd[ tileY + 1 ];
            ctbY++ ) {
                for( ctbX = tileColBd[ tileX ]; ctbX < tileColBd[ tileX + 1 ];
                ctbX++ ) {
                    CtbAddrInCurrSlice [ NumCtusInCurrSlice ] = ctbY *
```

-continued

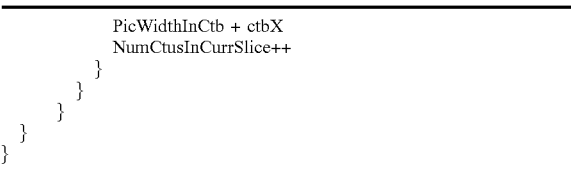

The proposed method may have a requirement of bitstream conformance that the order of the VCL NAL units within a coded picture is constrained as follows:

For any two coded slice NAL units A and B of a coded picture, let SubpicIdVal[subpicIdxA] and SubpicIdVal[subpicIdxB] be their slice_subpic_id values, sliceAddrA and sliceddrB be their slice_address values, and tileRowIdA and tileRowIdB be their tile_row_id values.

When any of the following conditions is true, coded slice NAL unit A shall precede coded slice NAL unit B:
   subpicIdxA is less than subpicIdxB.
   subpicIdxA is equal to subpicIdxB and sliceAddrA is less than sliceAddrB.
   rect_slice_flag is equal to 0, subpicIdxA is equal to subpicIdxB, sliceAddrA is equal to sliceAddrB, and tileRowIdA is less than tileRowIdB.

According to another aspect of the present disclosure, when the current slice is entirely contained within a tile, the proposed method may signal information for deriving the position of the slice and the number of consecutive CTU rows within the tile right after signaling the tile address of the slice or before signaling extra bits in the slice headers (related to the syntax sh_extra_bit). In this way, the related information for deriving slice partitioning for the current slice can be encoded or decoded together at the beginning of slice header. In Embodiment E as an example, we further modify Embodiment A according to the proposed method with the modified syntax table provided in Tables 5.

picture header (PH), to indicate whether to allow more than one slice contained in one tile in a coded picture. When the said one or more high-level syntax elements indicate that it is not allowed to have more than one slice contained in one tile, for each slice that is contained within a tile, the video coder may skip coding information for deriving the position and size of the slice within the tile for saving bit costs. When a current slice is contained within a tile, it is inferred that the slice contains the complete tile.

In Embodiment F as an example, we further modify Embodiment E according to the proposed method with modified syntax tables provided in Tables 6 and 7 for the PPS and the slice header, respectively. A new syntax element multiple_slices_in_tile_enabled_flag is further signaled in the PPS. multiple_slices_in_tile_enabled_flag equal to 1 indicates that one or more slices may be contained in a tile in the picture. multiple_slices_in_tile_enabled_flag equal to 0 indicates that no more than one slice shall be contained in any one of the tiles in the picture. When multiple_slices_in_tile_enabled_flag is equal to 0, the syntax elements num_rows_in_slice and tile_row_id in the slice header in the raster-scan slice mode (rect_slice_flag=0) or the syntax elements num_exp_slices_in_tile and exp_slice_height_in_ctus_minus1 in the PPS in the rectangular slice mode (rect_slice_flag=1) are not coded. Alternatively, we can signal rect_slice_flag before signaling multiple_slices_in_tile_enabled_flag. multiple_slices_in_tile_enabled_flag is signaled only when rect_slice_flag is equal to 0 and more than one slice in a tile is always allowed in the rectangular slice mode. In the proposed method, more than one slice in one tile is further supported in the raster-scan slice mode. Therefore, both rectangular slice mode and the raster-scan slice mode can be selected for coding a picture with one tile. We may signal the syntax element rect_slice_f-

TABLE 5

| The modified syntax table based on JVET-Q2001 according to Embodiment E | |
|---|---|
| | Descriptor |
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1 ) \| \| | |
|     ( !rect_slice_flag && NumTilesInPic > 1 ) ) | |
|     slice_address | u(v) |
|   if( !rect_slice_flag ) { | |
|     if( slice_address < NumTilesInPic − 1 ) | |
|       num_tiles_in_slice_minus1 | ue(v) |
|     if( num_tiles_in_slice_minus1 = = 0 && !no_pic_partition_flag && | |
|       RowHeight[ slice_address / NumTileColumns ] > 1) { | |
|       num_rows_in_slice | u(v) |
|       if( num_rows_in_slice ) | |
|         tile_row_id | ue(v) |
|     } | |
|   } | |
|   for( i = 0; i < NumExtraShBits; i++ ) | |
|     sh_extra_bit[ i ] | u(1) |
|   .... | |
| } | |

According to another aspect of the present disclosure, a video coder may further signal one or more syntax elements in one or more high-level syntax sets such as the sequence parameter set (SPS), the picture parameter set (PPS), and the lag without conditioning on if NumTilesInPic is greater than 1. Or we may signal rect_slice_flag conditioned on whether NumTilesInPic is greater than 1 or multiple_slices_in_tile_enabled_flag is equal to 1.

TABLE 6

The modified syntax table for the PPS based
on JVET-Q2001 according to Embodiment F

| | Descriptor |
|---|---|
| pic_parameter_set_rbsp( ) { | |
|   pps_pic_parameter_set_id | ue(v) |
|   .... | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     multiple_slices_in_tile_enabled_flag | u(1) |
|     if( NumTilesInPic >1 \|\| multiple_slices_in_tile_enabled_flag ) | |
|       rect_slice_flag | u(1) |
|     if( rect_slice_flag ) | |
|       single_slice_per_subpic_flag | u(1) |
|     if( rect_slice_flag && !single_slice_per_subpic_flag ) { | |
|       num_slices_in_pic_minus1 | ue(v) |
|       if( num_slices_in_pic_minus 1 > 0 ) | |
|         tile_idx_delta_present_flag \|\| | u(1) |
|       for( i = 0; i < num_slices_in_pic_minus1; i++ ) { | |
|         if( NumTileColumns > 1 ) | |
|           slice_width_in_tiles_minus1[ i ] | ue(v) |
|         if( NumTileRows > 1 && ( tile_idx_present_flag | |
|           SliceTopLeftTileIdx[ i ] % NumTileColumns = = 0 ) ) | |
|           slice_height_in_tiles_minus1[ i ] | ue(v) |
|         if( slice_width_in_tiles_minus1[ i ] = = 0 && | |
|           slice_height_in_tiles_minus1[ i ] = = 0 && | |
|           RowHeight[ SliceTopLeftTileIdx[ i ] / NumTileColumns ] > 1 | |
|           && multiple_slices_in_tile_enabled_flag ) { | |
|           num_exp_slices_in_tile[ i ] | ue(v) |
|           for( j = 0; j < num_exp_slices_in_tile[ i ]; j++ ) | |
|             exp_slice_height_in_ctus_minus1[ i ][ j ] | ue(v) |
|           i += NumSlicesInTile[ i ] − 1 | |
|         } | |
|         if( tile_idx_delta_present_flag && i < num_slices_in_pic_minus1 ) | |
|           tile_idx_delta[ i ] | se(v) |
|       } | |
|     } | |
|     .... | |
| } | |

TABLE 7

The modified syntax table for the slice header
based on JVET-Q2001 according to Embodiment F

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1 ) \|\| | |
|     ( !rect_slice_flag && NumTilesInPic > 1 ) ) | |
|     slice_address | u(v) |
|   if( !rect_slice_flag ) { | |
|     if( slice_address < NumTilesInPic − 1 ) | |
|       num_tiles_in_slice_minus1 | ue(v) |
|     if( num_tiles_in_slice_minus1 = = 0 && | |
|       RowHeight[ slice_address / NumTileColumns ] > 1 | |
|       && multiple_slices_in_tile_enabled_flag ) { | |
|         num_rows_in_slice | u(v) |
|       if( num_rows_in_slice ) | |

TABLE 7-continued

| | Descriptor |
|---|---|
| The modified syntax table for the slice header based on JVET-Q2001 according to Embodiment F | |
|         tile_row_id | ue(v) |
|     } | |
|   } | |
| for( i = 0; i < NumExtraShBits; i++ ) | |
|   sh_extra_bit[ i ] | u(1) |
|   .... | |
| } | |

The related semantics are as follows:

multiple_slices_in_tile_enabled_flag equal to 1 specifies that one or more slices may be contained in a tile for each coded picture referring to the PPS. multiple_slices_in_tile_enabled_flag equal to 0 specifies that no more than one slice shall be contained in any one tile for each coded picture referring to the PPS. When multiple_slices_in_tile_enabled_flag is not present, it is inferred to be equal to 0.

According to another aspect of the present disclosure, a video coder may signal one or more syntax elements in one or more high-level syntax sets such as the sequence parameter set (SPS), the picture parameter set (PPS), and the picture header (PH), to indicate that each slice contains exactly one complete tile in the coded picture. When the said one or more syntax elements indicate that each slice contains exactly one complete tile in the coded picture, the video coder may skip coding information for deriving slice partitioning for the coded picture and further save bit costs. The resulted slice partitioning for the coded picture is inferred to be the same as the tile partitioning for the coded picture.

In Embodiment G, Embodiment F is further modified according to the proposed method with the modified syntax table provided in Tables 8 for the PPS. A new syntax element single_slice_per_tile_flag is further signaled in the PPS. single_slice_per_tile_flag equal to 1 specifies that each slice consists of one and only one complete tile for each coded picture referring to the PPS. single_slice_per_tile_flag equal to 0 specifies that each slice may consist of one or more complete tile or be entirely contained within a tile for each coded picture referring to the PPS. When single_slice_per_tile_flag is equal to 0, the slice partitioning of the picture is not coded and is derived from the tile partitioning of the picture.

TABLE 8

| | Descriptor |
|---|---|
| The modified syntax table based on JVET-Q2001 according to Embodiment G | |
| pic_parameter_set_rbsp( ) { | |
|   pps_pic_parameter_set_id | ue(v) |
|   .... | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     rect_slice_flag | u(1) |
|     if( rect_slice_flag ) { | |
|       single_slice_per_subpic_flag | u(1) |
|       if( !single_slice_per_subpic_flag ) { | |
|         single_slice_per_tile_flag | u(1) |
|         if( !single_slice_per_tile_flag ) { | |
|           num_slices_in_pic_minus1 | ue(v) |
|           if( num_slices_in_pic_minus1 > 0 ) { | |
|             tile_idx_delta_present_flag | u(1) |
|             multiple_slices_in_tile_enabled_flag | u(1) |
|           } | |
|           for( i = 0; i < num_slices_in_pic_minus1; i++ ) { | |
|             if( NumTileColumns > 1 ) | |
|               slice_width_in_tiles_minus1[ i ] | ue(v) |
|             if( NumTileRows > 1 && ( tile_idx_delta_present_flag \|\| | |
|               SliceTopLeftTileIdx[ i ] % NumTileColumns = = 0 ) ) | |
|               slice_height_in_tiles_minus1[ i ] | ue(v) |
|             if( slice_width_in_tiles_minus1[ i ] = = 0 && | |
|               slice_height_in_tiles_minus1[ i ] = = 0 && | |
|               RowHeight[ SliceTopLeftTileIdx[ i ] / NumTileColumns ] > 1 | |
|               && multiple_slices_in_tile_enabled_flag ) { | |
|               num_exp_slices_in_tile[ i ] | ue(v) |
|               for( j = 0; j < num_exp_slices_in_tile[ i ]; j++ ) | |

TABLE 8-continued

The modified syntax table based on JVET-Q2001 according to Embodiment G

|  | Descriptor |
|---|---|
|           exp_slice_height_in_ctus_minus1[ i ][ j ] | ue(v) |
|         i += NumSlicesInTile[ i ] – 1 | |
|       } | |
|       if( tile_idx_delta_present_flag && i < | |
| num_slices_in_pic_minus1 ) | |
|         tile_idx_delta[ i ] | se(v) |
|       } | |
|     } | |
|   } | |
|  } else | |
|     multiple_slices_in_tile_enabled_flag | u(1) |
|   loop_filter_across_tiles_enabled_flag | u(1) |
|   loop_filter_across_slices_enabled_flag | u(1) |
|  } | |
|  .... | |
| } | |

The related semantics areas follows:

single_slice_per_tile_flag equal to 1 specifies that each slice consists of one and only one complete tile for each coded picture referring to the PPS. single_slice_per_tile_flag equal to 0 specifies that each slice may consist of one or more complete tile or be entirely contained within a tile for each coded picture referring to the PPS. When single_slice_per_tile_flag is not present, it is inferred to be equal to 0.

When rect_slice_flag is equal to 1, the list NumCtusInSlice[i] for i ranging from 0 to num_slices_in_pic_minus1, inclusive, specifying the number of CTUs in the i-th slice, the list SliceTopLeftTileIdx[i] for i ranging from 0 to num_slices_in_pic_minus1, inclusive, specifying the tile index of the tile containing the first CTU in the slice, and the matrix CtbAddrInSlice[i][j] for i ranging from 0 to num_slices_in_pic_minus1, inclusive, and j ranging from 0 to NumCtusInSlice[i]–1, inclusive, specifying the picture raster scan address of the j-th CTB within the i-th slice, and the variable NumSlicesInTile[i] specifying the number of slices in the tile containing the i-th slice, are derived as follows:

```
if( single_slice_per_subpic_flag ) {
    for( i = 0; i <= sps_num_subpics_minus1; i++ ) {
        NumCtusInSlice[ i ] = 0
        if( subpicHeightLessThanOneTileFlag[ i ] ) /* The slice consists of
a number of CTU rows in a tile. */
            AddCtbsToSlice( i, subpic_ctu_top_left_x[ i ],
                subpic_ctu_top_left_x[ i ] + subpic_width_minus1[ i ] +
                1, subpic_ctu_top_left_y[ i ],
                subpic_ctu_top_left_y[ i ] + subpic_height_minus1[ i ] +
                1 )
        else {/* The slice consists of a number of complete tiles covering a
rectangular region. */
            tileX = CtbToTileColBd[ subpic_ctu_top_left_x[ i ] ]
            tileY = CtbToTileRowBd[ subpic_ctu_top_left_y[ i ] ]
            for( j = 0; j < SubpicHeightInTiles[ i ]; j++ )
                for( k = 0; k < SubpicWidthInTiles[ i ]; k++ )
                    AddCtbsToSlice( i, tileColBd[ tileX + k ], tileColBd[ tileX +
                    k + 1 ],
tileRowBd[ tileY + j ],
                        tileRowBd[ tileY + j + 1 ] )
        }
    }
} else if( single_slice_per_tile_flag ) {
    for( i = 0, tileY = 0; tileY < NumTileRows; tileY++ )
        for( tileX = 0; tileX < NumTileColumns; tileX++ ) {
            AddCtbsToSlice( i, tileColBd[ tileX ], tileColBd[ tileX + 1 ],
                tileRowBd[ tileY ], tileRowBd[ tileY + 1 ] )
            i++
        }
```

-continued

```
} else {
    tileIdx = 0
    for( i = 0; i <= num_slices_in_pic_minus1; i++ )
        NumCtusInSlice[ i ] = 0
    for( i = 0; i <= num_slices_in_pic_minus1; i++ ) {
        SliceTopLeftTileIdx[ i ] = tileIdx
        tileX = tileIdx % NumTileColumns
        tileY = tileIdx / NumTileColumns
        if( i < num_slices_in_pic_minus1 ) {
            sliceWidthInTiles[ i ] = slice_width_in_tiles_minus1[ i ] + 1
            sliceHeightInTiles[ i ] = slice_height_in_tiles_minus1[ i ] + 1
        } else {
            sliceWidthInTiles[ i ] = NumTileColumns – tileX
            sliceHeightInTiles[ i ] = NumTileRows – tileY
            NumSlicesInTile[ i ] = 1
        }
        if( slicWidthInTiles[ i ] = = 1 && sliceHeightInTiles[ i ] = = 1) {
            if( num_exp_slices_in_tile[ i ] = = 0 ) {
                NumSlicesInTile[ i ] = 1
                sliceHeightInCtus[ i ] = RowHeight[ SliceTopLeftTileIdx[
                i ] / NumTileColumns ]
            } else {
                remainingHeightInCtbsY = RowHeight[ SliceTopLeftTileIdx[
                i ] / NumTileColumns ]
                for( j = 0; j < num_exp_slices_in_tile[ i ] – 1; j++ ) {
                    sliceHeightInCtus[ i + j ] =
                    exp_slice_height_in_ctus_minus1[ i ][ j ] + 1
                    remainingHeightInCtbsY –= sliceHeightInCtus[ i + j ]
                }
                uniformSliceHeight = exp_slice_height_in_ctus_minus1[ i ][
                j ] + 1
                while( remainingHeightInCtbsY >= uniformSliceHeight ) {
                    sliceHeightInCtus[ i + j ] = uniformSliceHeight
                    remainingHeightInCtbsY –= uniformSliceHeight
                    j++
                }
                if( remainingHeightInCtbsY > 0 ) {
                    sliceHeightInCtus[ i + j ] = remainingHeightInCtbsY
                    j++
                }
                NumSlicesInTile[ i ] = j
            }
            ctbY = tileRowBd[ tileY ]
            for( j = 0; j < NumSlicesInTile[ i ]; j++ ) {
                AddCtbsToSlice( i + j, tileColBd[ tileX ], tileColBd[ tileX + 1 ],
                    ctbY, ctbY + sliceHeightInCtus[ i + j ] )
                ctbY += sliceHeightInCtus[ i + j ]
            }
            i += NumSlicesInTile[ i ] – 1
        } else
            for( j = 0; j < sliceHeightInTiles[ i ]; j++)
                for( k = 0; k < sliceWidthInTiles[ i ]; k++ )
                    AddCtbsToSlice( i, tileColBd[ tileX + k ], tileColBd[ tileX +
                    k + 1 ],
```

-continued

```
        tileRowBd[ tileY + j ], tileRowBd[ tileY +j + 1 ])
    if( i < num_slices_in_pic_minus1 ) {
        if( tile_idx_delta_present_flag)
            tileIdx += tile_idx_delta[ i ]
``` posed method. The modified syntax table according to the proposed method is provided in Table 9 as an example for coding the slice header based on JVET-Q2001, wherein the variable NumTilesInPic specifies the number of the tiles in the current picture. The syntax element num_tiles_in_slice_minus1 is not coded and is inferred to be equal to 0 when slice_address is equal to (NumTilesInPic−1).

TABLE 9

| Example of the modified syntax table for the slice header based on JVET-Q2001 according to Embodiment H | |
| --- | --- |
|  | Descriptor |
| slice_header( ) { |  |
|   picture_header_in_slice_header_flag | u(1) |
|   if( picture_header_in_slice_header_flag ) |  |
|     picture_header_structure( ) |  |
|   if( subpic_info_present_flag ) |  |
|     slice_subpic_id | u(v) |
|   if( ( rect_slice_flag && NumSlicesInSubpic[ CurrSubpicIdx ] > 1 ) || |  |
|     ( !rect_slice_flag && NumTilesInPic > 1 ) ) |  |
|     slice_address | u(v) |
|   for( i = 0; i < NumExtraShBits; i++ ) |  |
|     sh_extra_bit[ i ] | u(1) |
|   if( !rect_slice_flag && slice_address < ( NumTilesInPic − 1 ) ) | *Note (1) |
|     num_tiles_in_slice_minus1 | ue(v) |
|   .... |  |
| } |  |

-continued

```
        else {
            tileIdx += sliceWidthInTiles[ i ]
            if( tileIdx % NumTile Columns = = 0 )
                tileIdx += ( sliceHeightInTiles[ i ] − 1 ) * NumTileColumns
        }
        }
    }
}
```

Where the function AddCtbsToSlice(sliceIdx, startX, stopX, startY, stopY) is specified as follows:

```
for( ctbY = startY; ctbY < stopY; ctbY++ )
    for( ctbX = startX; ctbX < stopX; ctbX++ ) {
        CtbAddrInSlice[ sliceIdx ][ NumCtusInSlice[ sliceIdx ] ] = ctbY *
        PicWidthInCtbsY + ctbX
        NumCtusInSlice[ sliceIdx ]++
    }
```

According to another embodiment, the method further comprises grouping one or more consecutive tiles in a tile raster scan order into the individual slice in the picture. The method may further comprises grouping one or more consecutive complete CTU rows within a tile into the individual slice in the picture. The method further comprises signaling information for deriving the position of the current slice and the number of the tiles contained in the current slice. Signaling information for deriving the position of the current slice comprises coding the raster scan tile index of the first tile in the current slice. The method may further comprise skipping signaling information for deriving the number of the tiles in the current slice when the tile index of the first tile in the current slice is equal to the last tile index of the current picture.

In Embodiment H, a video coder based on VVC Draft as specified in JVET-Q2001 is modified according to the pro- The related semantics are as follows:

num_tiles_in_slice_minus1 plus 1 specifies the number of tiles in the slice when rect_slice_flag is equal to 0. The value of num_tiles_in_slice_minus1 shall be in the range of 0 to NumTilesInPic−1−slice_address, inclusive. When rect_slice_flag is equal to 0 and num_tiles_in_slice_minus1 is not present, num_tiles_in_slice_minus1 is inferred to be equal to 0.

In Table 9, the condition for signaling num_tiles_in_slice_minus1 becomes both "!rect_slice_flag" and "slice_address<(NumTilesInPic−1)" are true as indicated by Note (1). In other words, the condition corresponds to non-rectangular slice mode is used (i.e., "!rect_slice_flag") and the slice address is not the last slice (i.e., "slice_address<(NumTilesInPic−1)"). On the other hand, the condition for signaling num_tiles_in_slice_minus1 according to JVET-Q2001 corresponds to both "!rect_slice_flag" and "NumTilesInPic>1" are true. The condition, "NumTilesInPic>1" means the number of tiles in the picture is greater than 1.

The present disclosure also reveals methods for efficiently signaling partitioning of a picture into slices in an image or video coding system.

Signaling Multiple Slices in Tile Enabled

According to one aspect of the present disclosure, a video coder may signal one or more syntax elements in one or more high-level syntax sets such as the sequence parameter set (SPS), the picture parameter set (PPS), and the picture header (PH), to indicate whether to allow more than one slice contained in any one of the tiles in a coded picture. When the said one or more high-level syntax elements indicate that it is not allowed to have more than one slice contained in any one tile, for each slice that is contained within a tile, the video coder may skip coding information for deriving slice partitioning within the tile and further save bit costs. When a current slice is contained within a tile, it is inferred that the slice contains the complete tile.

The proposed method of signaling the partitioning of a picture into one or more slices first comprises signaling information for deriving the partitioning of the picture into one or more tile rows and one or more tile columns and each tile is a sequence of CTUs covering a rectangular region of a picture. The method further comprises grouping one or more complete tiles or one or more consecutive complete CTU rows within a tile into the individual slice in the picture. The method further comprises signaling information for determining whether the current slice contains one or more complete tiles or contains one or more consecutive complete CTU rows within a tile. The method further comprises signaling information for deriving the position of the current slice and the number of tiles or CTU rows contained in the current slice for each of the slices in the picture. The method further comprises signaling information to indicate whether more than one slice is allowed to be contained in any one of the tiles in the picture. When it is indicated that more than one slice is not allowed to be contained in any one tile in the picture, the method may further comprise skipping signaling information for deriving slice partitioning within a tile. The method may further comprise signaling information to indicate that the slices in the picture are coded according to the raster-scan slice mode or the rectangular slice mode.

In Embodiment I, the video coder as specified in JVET-Q2001 is modified according to the proposed method with the modified syntax table provided in Table 10 for the PPS.

A new syntax element multiple_slices_in_tile_enabled_flag is further signaled in the PPS. multiple_slices_in_tile_enabled_flag equal to 1 indicates that one or more slices may be contained in a tile in the picture. multiple_slices_in_tile_enabled_flag equal to 0 indicates that no more than one slice shall be contained in any one of the tiles in the picture. When multiple_slices_in_tile_enabled_flag is equal to 0, the syntax elements num_exp_slices_in_tile and exp_slice_height_in_ctus_minus1 in the PPS in the rectangular slice mode are not coded.

TABLE 10

| The modified syntax table based on JVET-Q2001 according to Embodiment I | |
| --- | --- |
| | Descriptor |
| pic_parameter_set_rbsp( ) { | |
|   pps_pic_parameter_set_id | ue(v) |
|   .... | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     if( NumTilesInPic > 1 ) | |
|       rect_slice_flag | u(1) |
|     if( rect_slice_flag ) | |
|       single_slice_per_subpic_flag | u(1) |
|     if( rect_slice_flag && ! single_slice_per_subpic_flag ) { | |
|       num_slices_in_pic_minus1 | ue(v) |
|       if( num_slices_in_pic_minus1 > 0 ) { | |
|         tile_idx_delta_present_flag | u(1) |
|        multiple_slices_in_tile_enabled_flag | u(1) |
|       } | |
|       for( i = 0; i < num_slices_in_pic_minus1; i++ ) { | |
|         if( NumTileColumns > 1 ) | |
|           slice_width_in_tiles_minus1[ i ] | ue(v) |
|         if( NumTileRows > 1 && ( tile_idx_delta_present_flag \|\| | |
|           SliceTopLeftTileIdx[ i ] % NumTileColumns = = 0 ) ) | |
|           slice_height_in_tiles_minus1[ i ] | ue(v) |
|         if( slice_width_in_tiles_minus1[ i ] = = 0 && | |
|           slice_height_in_tiles_minus1[ i ] = = 0 && | |
|           RowHeight[ SliceTopLeftTileIdx[ i ] / NumTileColumns ] > 1 && | |
| multiple_slices_in_tile_enabled_flag ) { | |
|           num_exp_slices_in_tile[ i ] | ue(v) |
|           for( j = 0; j < num_exp_slices_in_tile[ i ]; j++ ) | |
|             exp_slice_height_in_ctus_minus1[ i ][ j ] | ue(v) |
|           i += NumSlicesInTile[ i ] − 1 | |
|         } | |
|         if( tile_idx_delta_present_flag && i < num_slices_in_pic_minus1 ) | |
|           tile_idx_delta[ i ] | se(v) |
|       } | |
|     } | |
|   .... | |
| } | |

The related semantics are as follows:

multiple_slices_in_tile_enabled_flag equal to 1 specifies that one or more slices may be contained in a tile for each coded picture referring to the PPS. multiple_slices_in_tile_enabled_flag equal to 0 specifies that no more than one slice shall be contained in any one tile for each coded picture referring to the PPS. When multiple_slices_in_tile_enabled_flag is not present, it is inferred to be equal to 0.

Signaling Single Slice Per Tile

According to another aspect of the present disclosure, a video coder may signal one or more syntax elements in one or more high-level syntax sets such as the sequence parameter set (SPS), the picture parameter set (PPS), and the picture header (PH), to indicate that each slice contains exactly one complete tile in the coded picture. When the said one or more syntax elements indicate that each slice contains exactly one complete tile in the coded picture, the video coder may skip coding information for deriving slice partitioning for the coded picture and further save bit costs. The resulted slice partitioning for the coded picture is inferred to be the same as the tile partitioning for the coded picture.

The proposed method of signaling the partitioning of a picture into one or more slices first comprises signaling information for deriving the partitioning of the picture into one or more tile rows and one or more tile columns and each tile is a sequence of CTUs covering a rectangular region of a picture. The method further comprises grouping one or more complete tiles or one or more consecutive complete CTU rows within a tile into the individual slice in the picture. The method further comprises signaling information for determining whether the current slice contains one or more complete tiles or contains one or more consecutive complete CTU rows within a tile. The method may further comprise signaling information for deriving the position of the current slice and the number of tiles or CTU rows contained in the current slice for each of the slices in the picture. The method further comprises signaling information to indicate that each slice contains exactly one complete tile in the coded picture. When it is indicated that each slice contains exactly one complete tile in the picture, the method may further comprise skipping coding information for deriving the slice partitioning for the picture and the slice partitioning for the picture is inferred to be the same as the tile partitioning of the picture. The method may further comprise signaling information to indicate that the slices in the picture are coded according to the raster-scan slice mode or the rectangular slice mode.

In Embodiment J, Embodiment I as shown in Table 10 is further modified according to the proposed method with the modified syntax table provided in Tables 11 for the PPS. A new syntax element single_slice_per_tile_flag is further signaled in the PPS. single_slice_per_tile_flag equal to 1 specifies that each slice consists of one and only one complete tile for each coded picture referring to the PPS. single_slice_per_tile_flag equal to 0 specifies that each slice may consist of one or more complete tile or be entirely contained within a tile for each coded picture referring to the PPS. When single_slice_per_tile_flag is equal to 0, the slice partitioning of the picture is not coded and is derived from the tile partitioning of the picture.

TABLE 11

| The modified syntax table based onJVET-Q2001 according to Embodiment J | |
| --- | --- |
| | Descriptor |
| pic_parameter_set_rbsp( ) { | |
|   pps_pic_parameter_set_id | ue(v) |
|   .... | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     if( NumTilesInPic > 1 ) | |
|       rect_slice_flag | u(1) |
|     if( rect_slice_flag ) { | |
|       single_slice_per_subpic_flag | u(1) |
|       if( !single_slice_per_subpic_flag ) { | |
|         single_slice_per_tile_flag | u(1) |
|         if( !single_slice_per_tile_flag ) { | |
|           num_slices_in_pic_minus1 | ue(v) |
|           if( num_slices_in_pic_minus1 > 0 ) { | |
|             tile_idx_delta_present_flag | u(1) |
|             multiple_slices_in_tile_enabled_flag | u(1) |
|           } | |
|           for( i = 0; i < num_slices_in_pic_minus1; i++ ) { | |
|             if( NumTileColumns > 1 ) | |
|               slice_width_in_tiles_minus1[ i ] | ue(v) |
|             if( NumTileRows > 1 && ( tile_idx_delta_present_flag \| \| | |
|               SliceTopLeftTileIdx[ i ] % NumTileColumns = = 0 ) ) | |
|               slice_height_in_tiles_minus1[ i ] | ue(v) |
|           if( slice_width_in_tiles_minus1[ i ] = = 0 && | |
|             slice_height_in_tiles_minus1[ i ] = = 0 && | |
|             RowHeight[ SliceTopLeftTileIdx[ i ] / NumTileColumns ] > 1 | |
|             && multiple_slices_in_tile_enabled_flag ) { | |
|             num_exp_slices_in_tile[ i ] | ue(v) |
|             for( j = 0; j < num_exp_slices_in_tile[ i ]; j++ ) | |
|               exp_slice_height_in_ctus_minus1[ i ][ j ] | ue(v) |
|             i += NumSlicesInTile[ i ] − 1 | |
|           } | |
|           if( tile_idx_delta_present_flag && i < | |
| num_slices_in_pic_minus1 ) | |

TABLE 11-continued

The modified syntax table based onJVET-Q2001 according to Embodiment J

|  | Descriptor |
|---|---|
|             tile__idx__delta[ i ] | se(v) |
|           } |  |
|         } |  |
|       } |  |
|    } |  |
|   loop__filter__across__tiles__enabled__flag | u(1) |
|   loop__filter__across__slices__enabled__flag | u(1) |
|  } |  |
|   .... |  |
| } |  |

The related semantics are as follows:

single_slice_per_tile_flag equal to 1 specifies that each slice consists of one and only one complete tile for each coded picture referring to the PPS. single_slice_per_tile_flag equal to 0 specifies that each slice may consist of one or more complete tile or be entirely contained within a tile for each coded picture referring to the PPS. When single_slice_per_tile_flag is not present, it is inferred to be equal to 0.

When rect_slice_flag is equal to 1, the list NumCtusIn-Slice[i] for i ranging from 0 to num_slices_in_pic_minus1, inclusive, specifying the number of CTUs in the i-th slice, the list SliceTopLeftTileIdx[i] for i ranging from 0 to num_slices_in_pic_minus1, inclusive, specifying the tile index of the tile containing the first CTU in the slice, and the matrix CtbAddrInSlice[i][j] for i ranging from 0 to num_slices_in_pic_minus1, inclusive, and j ranging from 0 to NumCtusInSlice[i]−1, inclusive, specifying the picture raster scan address of the j-th CTB within the i-th slice, and the variable NumSlicesInTile[i], specifying the number of slices in the tile containing the i-th slice, are derived as follows:

```
if( single_slice_per_subpic_flag ) {
    for( i = 0; i <= sps_num_subpics_minus1; i++ ) {
        NumCtusInSlice[ i ] = 0
        if( subpicHeightLessThanOneTileFlag[ i ] ) /* The slice consists of a
        number of CTU rows in a
                        tile. */
            AddCtbsToSlice( i, subpic_ctu_top_left_x[ i ],
                subpic_ctu_top_left_x[ i ] + subpic_width_minus1[ i ] + 1,
                subpic_ctu_top_left_y[ i ],
                subpic_ctu_top_left_y[ i ] + subpic_height_minus1[ i ] + 1 )
        else {/* The slice consists of a number of complete tiles covering a
        rectangular region. */
            tileX = CtbToTileColBd[ subpic_ctu_top_left_x[ i ] ]
            tileY = CtbToTileRowBd[ subpic_ctu_top_left_y[ i ] ]
            for( j = 0; j < SubpicHeightInTiles[ i ]; j++ )
                for( k = 0; k < SubpicWidthInTiles[ i ]; k++ )
                    AddCtbsToSlice( i, tileColBd[ tileX + k ], tileColBd[ tileX +
                    k + 1 ],
tileRowBd[ tileY + j ],
                    tileRowBd[ tileY + j + 1 ] )
        }
    }
} else if( single_slice_per_tile_flag ) {
    for( i = 0, tileY = 0; tileY < NumTileRows; tileY++ )
        for( tileX = 0; tileX < NumTileColumns; tileX++ ) {
            AddCtbsToSlice( i, tileColBd[ tileX ], tileColBd[ tileX + 1 ],
                tileRowBd[ tileY ], tileRowBd[ tileY + 1 ] )
            i++
        }
} else {
    tileIdx = 0
    for(i = 0; i <= num_slices_in_pic_minus1; i++ )
        NumCtusInSlice[ i ] = 0
    for(i = 0; i <= num_slices_in_pic_minus1; i++ ) {
```

-continued

```
        SliceTopLeftTileIdx[ i ] = tileIdx
        tileX = tileIdx % NumTileColumns
        tileY = tileIdx / NumTileColumns
        if( i < num_slices_in_pic_minus1 ) {
            sliceWidthInTiles[ i ] = slice_width_in_tiles_minus1[ i ] + 1
            sliceHeightInTiles[ i ] = slice_height_in_tiles_minus1[ i ] + 1
        } else {
            sliceWidthInTiles[ i ] = NumTileColumns − tileX
            sliceHeightInTiles[ i ] = NumTileRows − tileY
            NumSlicesInTile[ i ] = 1
        }
        if( slicWidthInTiles[ i ] = = 1 && sliceHeightInTiles[ i ] = = 1 ) {
            if( num_exp_slices_in_tile[ i ] = = 0 ) {
                NumSlicesInTile[ i ] = 1
                sliceHeightInCtus[ i ] = RowHeight[ SliceTopLeftTileIdx[
                i ] / NumTileColumns ]
            } else {
                remainingHeightInCtbsY = RowHeight[ SliceTopLeftTileIdx[
                i ] / NumTileColumns ]
                for( j = 0; j < num_exp_slices_in_tile[ i ] − 1; j++ ) {
                    sliceHeightInCtus[ i + j ] =
                    exp_slice_height_in_ctus_minus1[ i ][ j ] + 1
                    remainingHeightInCtbsY −= sliceHeightInCtus[ i + j ]
                }
                uniformSliceHeight = exp_slice_height_in_ctus_minus1[ i ][
                j ] + 1
                while( remainingHeightInCtbsY >= uniformSliceHeight ) {
                    sliceHeightInCtus[ i + j ] = uniformSliceHeight
                    remainingHeightInCtbsY −= uniformSliceHeight
                    j++
                }
                if( remainingHeightInCtbsY > 0 ) {
                    sliceHeightInCtus[ i + j ] = remainingHeightInCtbsY
                    j++
                }
                NumSlicesInTile[ i ] = j
            }
            ctbY = tileRowBd[ tileY ]
            for( j = 0; j < NumSlicesInTile[ i ]; j++ ) {
                AddCtbsToSlice( i + j, tileColBd[ tileX ], tileColBd[ tileX + 1 ],
                    ctbY, ctbY + sliceHeightInCtus[ i + j ] )
                ctbY += sliceHeightInCtus[ i + j ]
            }
            i += NumSlicesInTile[ i ] − 1
        } else
            for( j = 0; j < sliceHeightInTiles[ i ]; j++ )
                for( k = 0; k < sliceWidthInTiles[ i ]; k++ )
                    AddCtbsToSlice( i, tileColBd[ tileX + k ], tileColBd[ tileX +
                    k + 1 ],
                        tileRowBd[ tileY + j ], tileRowBd[ tileY + j + 1 ] )
        if( i < num_slices_in_pic_minus1 ) {
            if( tile_idx_delta_present_flag )
                tileIdx += tile_idx_delta[ i ]
```

-continued

```
    else {
        tileIdx += sliceWidthInTiles[ i ]
        if( tileIdx % NumTileColumns = = 0 )
            tileIdx += ( sliceHeightInTiles[ i ] – 1 ) * NumTileColumns
        }
    }
  }
}
```

Where the function AddCtbsToSlice(sliceIdx, startX, stopX, startY, stopY) is specified as follows:

```
for( ctbY = startY; ctbY < stopY; ctbY++ )
    for( ctbX = startX; ctbX < stopX; ctbX++ ) {
        CtbAddrInSlice[ sliceIdx ][ NumCtusInSlice[ sliceIdx ] ] = ctbY *
        PicWidthInCtbsY + ctbX
        NumCtusInSlice[ sliceIdx ]++
    }
```

In the VVC Draft as specified in JVET-Q2001, when the coded picture is to be further partitioned into more than one slice or one tile with the syntax element no_pic_partition_flag equal to 0, information for deriving the tile partitioning of a coded picture is signaled by the syntax elements pps_log 2_ctu_size_minus5, num_exp_tile_columns_minus1, num_exp_tile_rows_minus1, and tile_row_height_minus1 in the picture parameter set (PPS). pps_log 2_ctu_size_minus5 plus 5 specifies the luma coding tree block size of each CTU. It is a requirement of bitstream conformance that pps_log 2_ctu_size_minus5 shall be equal to the value of the syntax element sps_log 2_ctu_size_minus5 in the SPS. pps_log 2_ctu_size_minus5 is signaled in the PPS such that the PPS can be parsed independently from the SPS.

According to one aspect of the present invention, information on the tile partitioning of a coded picture is required for parsing a PPS only when the PPS shall select the rectangular slice mode and explicitly signal information for deriving slice partitioning of the picture. In the proposed, signaling information about the luma coding tree block size of each CTU in the coded picture is further conditioned on whether slice partitioning of the picture is explicitly signaled in the rectangular slice mode with rect_slice_flag equal to 1. In this way, the bit costs for signaling information on the luma coding tree block size of each CTU can be saved when such information is not used for parsing the PPS.

According to another aspect of the present invention, the syntax control flag specifying whether in-loop filtering operations shall be applied across tile boundaries is relevant only for the coded pictures containing more than one tile. In the proposed method, this control flag is signaled conditioned on whether the number of the tiles in the coded picture is greater than 1.

In Embodiment K, the video coder as specified in JVET-Q2001 is modified according to the present invention with the modified syntax table provided in Table 12 for the PPS. In the proposed method, pps_log 2_ctu_size_minus5 is signaled after it has been signaled that the picture is coded in the rectangular slice mode (rect_slice_flag=0) and the slice partitioning of the picture is explicitly coded (single_slice_per_subpic_flag=0). Signaling pps_log 2_ctu_size_minus5 can be further conditioned on if the number of slices in the picture is greater than 0.

TABLE 12

| The modified syntax table based on JVET-Q2001 according to Embodiment K | |
| --- | --- |
| | Descriptor |
| pic_parameter_set_rbsp( ) { | |
|   pps_pic_parameter_set_id | ue(v) |
|   .... | |
|   no_pic_partition_flag | u(1) |
|   if( !no_pic_partition_flag ) { | |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     rect_slice_flag | u(1) |
|     if( rect_slice_flag ) | |
|       single_slice_per_subpic_flag | u(1) |
|     if( rect_slice_flag && !single_slice_per_subpic_flag ) { | |
|       num_slices_in_pic_minus1 | ue(v) |
|       if( num_slices_in_pic_minus1 > 0 ) { | |
|         tile_idx_delta_present_flag | u(1) |
|         pps_log2_ctu_size_minus5 | u(2) |
|       } | |
|       for( i = 0; i < num_slices_in_pic_minus1; i++ ) { | |
|         if( NumTileColumns > 1 ) | |
|           slice_width_in_tiles_minus1[ i ] | ue(v) |
|         if( NumTileRows > 1 && ( tile_idx_delta_present_flag \|\| | |
|           SliceTopLeftTileIdx[ i ] % NumTileColumns = = 0 ) ) | |
|           slice_height_in_tiles_minus1[ i ] | ue(v) |
|         if( slice_width_in_tiles_minus1[ i ] = = 0 && | |
|           slice_height_in_tiles_minus1[ i ] = = 0 && | |
|           RowHeight[ SliceTopLeftTileIdx[ i ] / NumTileColumns ] > 1 ) { | |
|           num_exp_slices_in_tile[ i ] | ue(v) |
|           for( j = 0; j < num_exp_slices_in_tile[ i ]; j++ ) | |
|             exp_slice_height_in_ctus_minus1[ i ][ j ] | ue(v) |
|           i += NumSlicesInTile[ i ] – 1 | |
|         } | |
|         if( tile_idx_delta_present_flag && i < num_slices_in_pic_minus1 ) | |

TABLE 12-continued

| The modified syntax table based on JVET-Q2001 according to Embodiment K | |
| --- | --- |
| | Descriptor |
| tile_idx_delta[ i ] | se(v) |
| } | |
| } | |
| loop_filter_across_tiles_enabled_flag | u(1) |
| loop_filter_across_slices_enabled_flag | u(1) |
| .... | |
| } | |

In Embodiment L based on JVET-Q2001, the syntax elements num_exp_tile_columns_minus1 and num_exp_tile_rows_minus1 are replaced by the new syntax elements num_exp_tile_columns and num_tile_rows for deriving the numbers of the explicitly provided tile columns and tile rows, respectively, as shown in Table 13. num_exp_tile_columns equal to 0 infers that the picture contains one tile column equal to the picture width. num_tile_rows equal to 0 infers that the picture contains one tile row equal to the picture height. Without signaling pps_log 2 ctu_size_minus5 for deriving the tile partitioning of the picture, a video coder can still determine whether the number of the tiles in the picture is greater than 1 by the value of the variable MultipleTilesInPic equal to (num_exp_tile_columns|| num_exp_tile_rows). When MultipleTilesInPic is equal to 0, the video coder may further skip coding the syntax element loop_filter_across_tiles_enabled_flag in the PPS.

TABLE 13

| The modified syntax table based on JVET-Q2001 according to Embodiment L | |
| --- | --- |
| | Descriptor |
| pic_parameter_set_rbsp( ) { | |
|   pps_pic_parameter_set_id | ue(v) |
|   .... | |
|   no_pic_partition_flag | u(1) |
|   if( !no_pic_partition_flag ) { | |
|     num_exp_tile_columns | ue(v) |
|     num_exp_tile_rows | ue(v) |
|     for( i = 0; i < num_exp_tile_columns; i++ ) | |
|       tile_column_width_minus1[ i ] | ue(v) |
|     for( i = 0; i < num_exp_tile_rows; i++ ) | |
|       tile_row_height_minus1[ i ] | ue(v) |
|     MultipleTilesInPic = num_exp_tile_columns \| \| num_exp_tile_rows | |
|     if( MultipleTileInPic ) | |
|       rect_slice_flag | u(1) |
|     if( rect_slice_flag ) | |
|       single_slice_per_subpic_flag | u(1) |
|     if( rect_slice_flag && !single_slice_per_subpic_flag ) { | |
|       num_slices_in_pic_minus1 | ue(v) |
|       if( num_slices_in_pic_minus1 > 0 ) { | |
|         tile_idx_delta_present_flag | u(1) |
|         if( MultipleTileInPic ) | |
|           pps_log2_ctu_size_minus5 | u(2) |
|       } | |
|       for( i = 0; i < num_slices_in_pic_minus1; i++ ) { | |
|         if( NumTileColumns > 1 ) | |
|           slice_width_in_tiles_minus1[ i ] | ue(v) |
|         if( NumTileRows > 1 && ( tile_idx_delta_present_flag \| \| | |
|           SliceTopLeftTileIdx[ i ] % NumTileColumns = = 0 ) ) | |
|           slice_height_in_tiles_minus1[ i ] | ue(v) |
|         if( slice_width_in_tiles_minus1[ i ] = = 0 && | |
|           slice_height_in_tiles_minus1[ i ] = = 0 && | |
|           RowHeight[ SliceTopLeftTileIdx[ i ] / NumTileColumns ] > 1 ) { | |
|           num_exp_slices_in_tile[ i ] | ue(v) |
|           for( j = 0; j < num_exp_slices_in_tile[ i ]; j++ ) | |
|             exp_slice_height_in_ctus_minus1[ i ][ j ] | ue(v) |
|           i += NumSlicesInTile[ i ] − 1 | |
|         } | |
|         if( tile_idx_delta_present_flag && i < num_slices_in_pic_minus1 ) | |
|           tile_idx_delta[ i ] | se(v) |
|       } | |
|     } | |
|     if( MultipleTileInPic ) | *Note (2) |
|       loop_filter_across_tiles_enabled_flag | u(1) |
|       loop_filter_across_slices_enabled_flag | u(1) |
|     .... | |
|   } | |

The variable NumTileColumns, specifying the number of tile columns, and the list colWidth[i] for i ranging from 0 to NumTileColumns−1, inclusive, specifying the width of the i-th tile column in units of CTBs, are derived as follows:

```
if( num_exp_tile_columns = = 0 ) {
        colWidth[0] = PicWidthInCtbsY
            NumTileColumns = 1
} else {
    remainingWidthInCtbsY = PicWidthInCtbsY
    for( i = 0; i < num_exp_tile_columns − 1; i++ ) {
        colWidth[ i ] = tile_column_width_minus1[ i ] + 1
        remainingWidthInCtbsY −= colWidth[ i ]
    }
    uniformTileColWidth = tile_column_width_minus1[
    num_exp_tile_columns − 1 ] + 1
    while( remainingWidthInCtbsY >= uniformTileColWidth ) {
        colWidth[ i++ ] = uniformTileColWidth
        remainingWidthInCtbsY −= uniformTileColWidth
    }
    if( remainingWidthInCtbsY > 0 )
        colWidth[ i++ ] = remainingWidthInCtbsY
    NumTileColumns = i
    }
```

The variable NumTileRows, specifying the number of tile rows, and the list RowHeight[j] for j ranging from 0 to NumTileRows−1, inclusive, specifying the height of the j-th tile row in units of CTBs, are derived as follows:

```
if( num_exp_tile_rows = = 0 ) {
    RowHeight [0] = PicHeightInCtbsY
    NumTileRows = 1
} else {
    remainingHeightInCtbsY = PicHeightInCtbsY
    for( j = 0; j < num_exp_tile_rows − 1; j++ ) {
        RowHeight[ j ] = tile_row_height_minus1[ j ] + 1
        remainingHeightInCtbsY −= RowHeight[ j ]
    }
    uniformTileRowHeight = tile_row_height_minus1[
    num_exp_tile_rows − 1 ] + 1
    while( remainingHeightInCtbsY >= uniformTileRowHeight ) {
        RowHeight[ j++ ] = uniformTileRowHeight
        remainingHeightInCtbsY −= uniformTileRowHeight
    }
    if( remainingHeightInCtbsY > 0 )
        RowHeight[ j++ ] = remainingHeightInCtbsY
    NumTileRows = j
    }
```

The related semantics are as follows:

num_exp_tile_columns specifies the number of explicitly provided tile column widths. The value of num_exp_tile_columns shall be in the range of 0 to PicWidthInCtbsY−1, inclusive. When no_pic_partition_flag is equal to 1, the value of num_exp_tile_columns is inferred to be equal to 0.

num_exp_tile_rows specifies the number of explicitly provided tile row heights. The value of num_exp_tile_rows shall be in the range of 0 to PicHeightInCtbsY−1, inclusive. When no_pic_partition_flag is equal to 1, the value of num_tile_rows is inferred to be equal to 0.

tile_column_width_minus1[i] plus 1 specifies the width of the i-th tile column in units of CTBs for i in the range of 0 to num_exp_tile_columns−2, inclusive, when num_exp_tile_columns is greater than 1. tile_column_width_minus1[num_exp_tile_columns−1] is used to derive the width of the tile columns with index greater than or equal to num_exp_tile_columns−1 as specified in clause 6.5.1 when num_exp_tile_columns is greater than 0. The value of tile_column_width_minus1[i] shall be in the range of 0 to PicWidthInCtbsY−1, inclusive. When not present, the value of tile_column_width_minus1[0] is inferred to be equal to PicWidthInCtbsY−1.

tile_row_height_minus1[i] plus 1 specifies the height of the i-th tile row in units of CTBs for i in the range of 0 to num_exp_tile_rows−2, inclusive, when num_exp_tile_rows is greater than 1. tile_row_height_minus1[num_exp_tile_rows−1] is used to derive the height of the tile rows with index greater than or equal to num_exp_tile_rows−1 as specified in clause 6.5.1 when num_exp_tile_rows is greater than 0. The value of tile_row_height_minus1[i] shall be in the range of 0 to PicHeightInCtbsY−1, inclusive. When not present, the value of tile_row_height_minus1[0] is inferred to be equal to PicHeightInCtbsY−1.

In Table 13, a syntax (i.e., loop_filter_across_tiles_enabled_flag) indicating whether in-loop filtering is applied across tile boundaries is signaled if the condition (MultipleTileInPic) is true. The condition corresponds to multiple tiles existing in the picture.

The present disclosure further reveals a modified method for partitioning of a picture into slices in an image or video coding system. According to one aspect of the present disclosure, a video coder in the raster-scan slice mode shall further support the slice that contains a number of consecutive complete CTU rows within one tile of a picture. In this way, the video coder may further divide each tile in a current picture into more than one slice when the picture is coded in the raster-scan slice mode. The proposed method of signaling the partitioning of a picture into one or more slices first comprises signaling information for deriving the partitioning of the picture into one or more tile rows and one or more tile columns and each tile is a sequence of CTUs covering a rectangular region of a picture. The method further comprises grouping one or more consecutive complete tiles in a tile raster scan order or one or more consecutive complete CTU rows within a tile into the individual slice in the picture. The method further comprises signaling information for determining whether the current slice contains one or more consecutive complete tiles or contains one or more consecutive complete CTU rows within a tile. In one embodiment, when it is signaled that the current slice is entirely contained in one tile, a syntax flag is further signaled to indicate whether the current slice contains a complete tile. The method further comprises signaling information for deriving the position of the current slice and the number of consecutive tiles or CTU rows contained in the current slice for each of the slices in the picture. The method may further comprise signaling information to indicate that the slices in the picture are coded according to the raster-scan slice mode or the rectangular slice mode.

In some embodiments, the position of the current slice in the picture may be signaled by coding the raster scan tile index of the first tile in the current slice. When the picture contains only one tile, coding the raster scan tile index of the first tile in the current slice is skipped and the raster scan tile index is inferred to be equal to 0. When the tile index of the first tile in the current slice is equal to the last tile index in the picture, the method may skip signaling information for deriving the number of the tiles in the current slice and the number of the tiles in the current slice is inferred to be equal to 1. When the current slice is entirely contained within one tile, in some embodiments, the position of the current slice may be signaled by coding information for deriving the raster scan tile index of the associated tile and the first CTU row index of the current slice within the associated tile. The coding system may have a requirement of bitstream conformance that the pair of the tile index value and the first CTU row index value of the current slice shall not be the same as the pair of the tile index value and the first CTU row index value of any other slices in the same coded picture. In one embodiment, a video coder may signal the number of CTU rows in the current slice before signaling the first CTU row index of the current slice. When the number of tile CTU rows in the current slice is equal to the row height of the associated tile, the video coder may skip coding information for deriving the first CTU row index of the current slice and infer the first CTU row index of the current slice within the associated tile to be equal to 0. In another embodiment, a video coder may signal the first CTU row index of the current slice within the associated tile before signaling the number of tile CTU rows in the current slice. When the first CTU row index of the current slice is equal to the last CTU row index within the tile, the video coder may skip coding information for deriving the number of CTU rows in the current slice and the number of CTU rows in the current slice is inferred to be equal to 1.

In some embodiments, video coders based on VVC Draft as specified in JVET-Q2001 are modified according to the proposed method. In Embodiment M, when the syntax element rect_slice_flag is equal to 0 and the syntax element num_tiles_in_slice_minus1 is equal to 0, it indicates that the current slice is coded in the raster-scan slice mode, the number of the tiles in the coded slice is equal to 1 and the current slice is entirely contained in one tile. A new syntax element num_rows_in_slice is further signaled for deriving the number of the CTU rows in the current slice. num_rows_in_slice equal to 0 indicate that the current slice contains all CTU rows within the associated tile with the raster scan tile index slice_address. When num_rows_in_slice is greater than 0, it specifies the number of consecutive complete CTU rows within the associated tile in the current slice. When num_rows_in_slice is greater than 0, a new syntax element tile_row_id is further signaled for specifying the first CTU row index of the current slice in the associated tile. When num_rows_in_slice is equal to 0, tile_row_id may be inferred to be equal to 0 and is not explicitly signaled. When the associated tile contains only one CTU row, both num_rows_in_slice and tile_row_id may be inferred to be equal to 0 and are not explicitly signaled. The modified syntax table based on NVET-Q2001 according to the proposed method for Embodiment M is provided in Table 14.

TABLE 14

The modified syntax table based on JVET-Q2001 according to Embodiment M

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1 ) | |
| \|\| | |
|     ( !rect_slice_flag && NumTilesInPic > 1 ) ) | |
|     slice_address | u(v) |
|   for( i = 0; i < NumExtraShBits; i++ ) | |
|     sh_extra_bit[ i ] | u(1) |
|   if( !rect_slice_flag ) { | |
|     if( slice_address < NumTilesInPic − 1 ) | |
|       num_tiles_in_slice_minus1 | ue(v) |
|     if( num_tiles_in_slice_minus1 = = 0 && | |
|       RowHeight[ slice_address / NumTileColumns ] > 1) { | |
|         num_rows_in_slice | u(v) |
|       if( num_rows_in_slice ) | |
|         tile_row_id | ue(v) |
|     } | |
|   } | |
|   .... | |
| } | |

The related semantics are as follows:

slice_subpic_id specifies the subpicture ID of the subpicture that contains the slice. If slice_subpic_id is present, the value of the variable CurrSubpicIdx is derived to be such that SubpicIdVal[CurrSubpicIdx] is equal to slice_subpic_id. Otherwise (slice_subpic_id is not present), slice_subpic_id is inferred to be equal to SubpicIdVal[0] and CurrSubpicIdx is derived to be equal to 0. The length of slice_subpic_id is sps_subpic_id_len_minus1+1 bits.

slice_address specifies the slice address of the slice. When not present, the value of slice_address is inferred to be equal to 0.

If rect_slice_flag is equal to 0, the following applies:

The slice address is the raster scan tile index of the first tile in the slice.

The length of slice_address is Ceil(Log 2 (NumTilesInPic)) bits.

The value of slice_address shall be in the range of 0 to NumTilesInPic−1, inclusive.

Otherwise (rect_slice_flag is equal to 1), the following applies:

The slice address is the subpicture-level slice index of the slice.

The length of slice_address is Ceil(Log 2(NumSlicesInSubpic[CurrSubpicIdx])) bits.

The value of slice_address shall be in the range of 0 to NumSlicesInSubpic[CurrSubpicIdx]−1, inclusive.

sh_extra_bit[i] may be equal to 1 or 0. Decoders conforming to this version of this Specification shall ignore the value of sh_extra_bit[i]. Its value does not affect decoder conformance to profiles specified in this version of specification.

num_tiles_in_slice_minus1 plus 1 specifies the number of tiles in the slice when rect_slice_flag is equal to 0. The value of num_tiles_in_slice_minus1 shall be in the range of 0 to NumTilesInPic−1−slice_address, inclusive. When rect_slice_flag is equal to 0 and num_tiles_in_slice_minus1 is not present, the value of num_tiles_in_slice_minus1 is inferred to be equal to 0.

num_rows_in_slice equal to 0 specifies that the number of consecutive complete CTU rows within the tile with the raster scan tile index slice_address in the slice is equal to RowHeight[slice_address/NumTileColumns] when num_tiles_in_slice_minus1 is equal to 0. When num_tiles_in_slice_minus1 is equal to 0 and num_rows_in_slice is greater than 0, num_rows_in_slice specifies the number of consecutive complete CTU rows within the tile with the raster scan tile index slice_address in the slice. The value of num_rows_in_slice shall be in the range of 0 to RowHeight[slice_address/NumTileColumns]−1. When num_tiles_in_slice_minus1 is equal to 0 and num_rows_in_slice is not present, the value of num_rows_in_slice is inferred to be equal to 0.

tile_row_id specifies the first CTU row index of the slice within the tile with the raster scan tile index slice_address. The length of tile_row_id is Ceil(Log 2 (RowHeight[slice_address/NumTileColumns])) bits. The value of tile_row_id shall be in the range of 0 to RowHeight[slice_address/NumTileColumns]−1. When rect_slice_flag is equal to 0 and tile_row_id is not present, the value of tile_row_id is inferred to be equal to 0.

It is a requirement of bitstream conformance that the following constraints apply:

If rect_slice_flag is equal to 0, the pair of slice_address and tile_row_id values shall not be equal to the pair of slice_address and tile_row_id values of any other coded slice NAL unit of the same coded picture.

Otherwise, the pair of slice_subpic_id and slice_address values shall not be equal to the pair of slice_subpic_id and slice_address values of any other coded slice NAL unit of the same coded picture.

The shapes of the slices of a picture shall be such that each CTU, when decoded, shall have its entire left boundary and entire top boundary consisting of a picture boundary or consisting of boundaries of previously decoded CTU(s).

If rect_slice_flag is equal to 0 and num_tiles_in_slice_minus1 is equal to 0, the sum of num_rows_in_slice and tile_row_id shall be less than or equal to RowHeight[slice_address/NumTileColumns].

The variable NumCtusInCurrSlice, which specifies the number of CTUs in the current slice, and the list CtbAddrInCurrSlice[i], for i ranging from 0 to NumCtusInCurrSlice−1, inclusive, specifying the picture raster scan address of the i-th CTB within the slice, are derived as follows:

```
if( rect_slice_flag) {
    picLevelSliceIdx = slice_address
    for( j = 0; j < CurrSubpicIdx; j++ )
        picLevelSliceIdx += NumSlicesInSubpic[ j ]
    NumCtusInCurrSlice = NumCtusInSlice[ picLevelSliceIdx ]
    for( i = 0; i < NumCtusInCurrSlice; i++ )
        CtbAddrInCurrSlice[ i ] = CtbAddrInSlice[ picLevelSliceIdx ][ i ]
} else {
    NumCtusInCurrSlice = 0
    if( num_tiles_in_slice_minus1 = = 0 && num_rows_in_slice ) {
        tileIdx = slice_address
        tileX = tileIdx % NumTileColumns
        tileY = tileIdx / NumTileColumns
        for( i = 0, ctbY = tileRowBd[ tileY ] + tile_row_id; i <
        num_rows_in_slice; ctbY++, i++ ) {
            for( ctbX = tileColBd[ tileX ]; ctbX < tileColBd[ tileX + 1 ];
            ctbX++) {
                CtbAddrInCurrSlice[ NumCtusInCurrSlice ] = ctbY *
                PicWidthInCtb + ctbX
                NumCtusInCurrSlice++
            }
        }
    } else {
for( tileIdx = slice_address; tileIdx <= slice_address +
num_tiles_in_slice_minus1; tileIdx++) {
        tileX = tileIdx % NumTileColumns
        tileY = tileIdx / NumTileColumns
        for( ctbY = tileRowBd[ tileY ]; ctbY < tileRowBd[ tileY + 1 ];
        ctbY++ ) {
            for( ctbX = tileColBd[ tileX ]; ctbX < tileColBd[ tileX + 1 ];
            ctbX++ ) {
                CtbAddrInCurrSlice[ NumCtusInCurrSlice ] = ctbY *
                PicWidthInCtb + ctbX
                NumCtusInCurrSlice++
            }
        }
    }
}
}
```

In Embodiment N, when the syntax element rect_slice_flag is equal to 0 and the syntax element num_tiles_in_slice_minus1 is equal to 0, it indicates that the current slice is coded in the raster-scan slice mode, the number of the tiles in the coded slice is equal to 1 and the current slice is entirely contained in one tile. A new syntax element tile_row_id is further signaled for specifying the first CTU row index of the current slice in the associated tile. Another new syntax element num_rows_in_slice is further signaled for deriving the number of the CTU rows in the current slice. num_rows_in_slice equal to 0 indicates that the current slice contains all remaining CTU rows starting from the CTU row index tile_row_id within the associated tile with the raster scan tile index slice_address. When num_rows_in_slice is greater than 0, it specifies the number of consecutive complete CTU rows within the associated tile in the current slice. When tile_row_id is equal to the last tile index of the associated tile, num_rows_in_slice is inferred to be equal to 0 and is not explicitly signaled. When the associated tile contains only one CTU row, both num_rows_in_slice and tile_row_id may be inferred to be equal to 0 and are not explicitly signaled. The modified syntax table based on JVET-Q2001 according to the proposed method for Embodiment N is provided in Table 15.

TABLE 15

The modified syntax table based on JVET-Q2001 according to Embodiment N

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1 ) || | |
|     ( !rect_slice_flag && NumTilesInPic > 1 ) ) | |
|     slice_address | u(v) |
|   for( i = 0; i < NumExtraShBits; i++ ) | |
|     sh_extra_bit[ i ] | u(1) |
|   if( !rect_slice_flag ) { | |
|     if( slice_address < NumTilesInPic − 1 ) | |
|       num_tiles_in_slice_minus1 | ue(v) |
|     if( num_tiles_in_slice_minus1 = = 0 && | |
|       RowHeight[ slice_address / NumTileColumns ] > 1) { | |
|         tile_row_id | u(v) |
|       if( tile_row_id < RowHeight[ slice_address / NumTileColumns ] − 1 ) | |
|         num_rows_in_slice | ue(v) |
|     } | |
|   } | |
|   .... | |
| } | |

The related semantics are as follows:

slice_subpic_id specifies the subpicture ID of the subpicture that contains the slice. If slice_subpic_id is present, the value of the variable CurrSubpicIdx is derived to be such that SubpicIdVal[CurrSubpicIdx] is equal to slice_subpic_id. Otherwise (slice_subpic_id is not present), slice_subpic_id is inferred to be equal to SubpicIdVal[0] and CurrSubpicIdx is derived to be equal to 0. The length of slice_subpic_id is sps_subpic_id_len_minus1+1 bits.

slice_address specifies the slice address of the slice. When not present, the value of slice_address is inferred to be equal to 0.

If rect_slice_flag is equal to 0, the following applies:
The slice address is the raster scan tile index of the first tile in the slice.
The length of slice_address is Ceil(Log 2 (NumTilesInPic)) bits.
The value of slice_address shall be in the range of 0 to NumTilesInPic−1, inclusive.
Otherwise (rect_slice_flag is equal to 1), the following applies:
The slice address is the subpicture-level slice index of the slice.
The length of slice_address is Ceil(Log 2(NumSlicesInSubpic[CurrSubpicIdx])) bits.
The value of slice_address shall be in the range of 0 to NumSlicesInSubpic[CurrSubpicIdx]−1, inclusive.

sh_extra_bit[i] may be equal to 1 or 0. Decoders conforming to this version of this Specification shall ignore the value of sh_extra_bit[i]. Its value does not affect decoder conformance to profiles specified in this version of specification.

num_tiles_in_slice_minus1 plus 1 specifies the number of tiles in the slice when rect_slice_flag is equal to 0. The value of num_tiles_in_slice_minus1 shall be in the range of 0 to NumTilesInPic−1−slice_address, inclusive. When rect_slice_flag is equal to 0 and num_tiles_in_slice_minus1 is not present, the value of num_tiles_in_slice_minus1 is inferred to be equal to 0.

tile_row_id specifies the first CTU row index of the slice within the tile with the tile index specified by slice_address. The length of tile_row_id is Ceil(Log 2 (RowHeight [slice_address/NumTileColumns])) bits. The value of tile_row_id shall be in the range of 0 to RowHeight [slice_address/NumTileColumns]−1. When rect_slice_flag is equal to 0 and tile_row_id is not present, the value of tile_row_id is inferred to be equal to 0.

num_rows_in_slice equal to 0 specifies that the number of consecutive complete CTU rows within the tile with the raster scan tile index slice_address in the slice is equal to RowHeight[slice_address/NumTileColumns]−tile_row_id when num_tiles_in_slice_minus1 is equal to 0. When num_tiles_in_slice_minus1 is equal to 0 and num_rows_in_slice is greater than 0, num_rows_in_slice specifies the number of consecutive complete CTU rows within the tile with the raster scan tile index slice_address in the slice. The value of num_rows_in_slice shall be in the range of 0 to RowHeight[slice_address/NumTileColumns]−tile_row_id−1. When num_tiles_in_slice_minus1 is equal to 0 and num_rows_in_slice is not present, the value of num_rows_in_slice is inferred to be equal to 0.

It is a requirement of bitstream conformance that the following constraints apply:
If rect_slice_flag is equal to 0, the pair of slice_address and tile_row_id values shall not be equal to the pair of slice_address and tile_row_id values of any other coded slice NAL unit of the same coded picture.
Otherwise, the pair of slice_subpic_id and slice_address values shall not be equal to the pair of slice_subpic_id and slice_address values of any other coded slice NAL unit of the same coded picture.
The shapes of the slices of a picture shall be such that each CTU, when decoded, shall have its entire left boundary and entire top boundary consisting of a picture boundary or consisting of boundaries of previously decoded CTU(s).

If rect_slice_flag is equal to 0 and num_tiles_in_slice_minus1 is equal to 0, the sum of num_rows_in_slice and tile_row_id shall be less than or equal to RowHeight[slice_address/NumTileColumns].

The variable NumCtusInCurrSlice, which specifies the number of CTUs in the current slice, and the list CtbAddrIn-CurrSlice[i], for i ranging from 0 to NumCtusInCurrSlice−1, inclusive, specifying the picture raster scan address of the i-th CTB within the slice, are derived as follows:

```
if( rect_slice_flag) {
    picLevelSliceIdx = slice_address
    for( j = 0; j < CurrSubpicIdx; j++ )
        picLevelSliceIdx += NumSlicesInSubpic[ j ]
    NumCtusInCurrSlice = NumCtusInSlice[ picLevelSliceIdx ]
    for( i = 0; i < NumCtusInCurrSlice; i++ )
        CtbAddrInCurrSlice[ i ] = CtbAddrInSlice[ picLevelSliceIdx ][ i ]
} else {
    NumCtusInCurrSlice = 0
    if( tile_row_id || num_rows_in_slice ) {
        tileIdx = slice_address
        tileX = tileIdx % NumTileColumns
        tileY = tileIdx / NumTileColumns
        numRowsInSlice = num_rows_in_slice? num_rows_in_slice :
            ( RowHeight[ slice_address / NumTileColumns ]. −
            tile_row_id )
        for( i = 0, ctbY = tileRowBd[ tileY ] + tile_row_id; i <
        numRowsInSlice; ctbY++, i++ ) {
            for( ctbX = tileColBd[ tileX ]; ctbX < tileColBd[ tileX + 1 ];
            ctbX++) {
                CtbAddrInCurrSlice[ NumCtusInCurrSlice ] = ctbY *
                PicWidthInCtb + ctbX
                NumCtusInCurrSlice++
            }
        }
    } else {
    for( tileIdx = slice_address; tileIdx <= slice_address +
    num_tiles_in_slice_minus1; tileIdx++ ) {
```

-continued

```
        tileX = tileIdx % NumTileColumns
        tileY = tileIdx / NumTileColumns
        for( ctbY = tileRowBd[ tileY ]; ctbY < tileRowBd[ tileY + 1 ];
        ctbY++ ) {
            for( ctbX = tileColBd[ tileX ]; ctbX < tileColBd[ tileX + 1 ];
            ctbX++ ) {
                CtbAddrInCurrSlice [ NumCtusInCurrSlice ] = ctbY *
                PicWidthInCtb + ctbX
                NumCtusInCurrSlice++
            }
        }
    }
}
}
```

In Embodiment O, when the syntax element rect_slice_flag is equal to 0 and the syntax element num_tiles_in_slice_minus1 is equal to 0, it indicates that the current slice is coded in the raster-scan slice mode, the number of the tiles in the coded slice is equal to 1, the current slice is entirely contained in one tile, and a new syntax element part_tile_in_slice_flag is further signaled. part_tile_in_slice_flag equal to 1 specifies that the new syntax elements tile_row_id and num_rows_in_slice_minus1 follow next in the slice header. tile_row_id specifies the first CTU row index of the current slice in the associated tile with the raster scan tile index equal to slice_address. num_rows_in_slice_minus1 plus 1 specifies the number of the CTU rows in the current slice. When tile_row_id is equal to the last tile index of the associated tile, num_rows_in_slice_minus1 is inferred to be equal to 0 and is not explicitly signaled. part_tile_in_slice_flag equal to 0 specifies that the current slice contains a number of consecutive complete tiles. When the associated tile contains only one CTU row, part_tile_in_slice_flag, num_rows_in_slice and tile_row_id may be inferred to be equal to 0 and are not explicitly signaled. The modified syntax table based on JVET-Q2001 according to the proposed method for Embodiment O is provided in Table 16.

TABLE 16

| The modified syntax table based on JVET-Q2001 according to Embodiment O | |
|---|---|
| | Descriptor |
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1 ) | |
|   || | |
|     ( !rect_slice_flag && NumTilesInPic > 1 ) ) | |
|     slice_address | u(v) |
|   for( i = 0; i < NumExtraShBits; i++ ) | |
|     sh_extra_bit[ i ] | u(1) |
|   if( !rect_slice_flag ) { | |
|     if( slice_address < ( NumTilesInPic − 1) ) | |
|       num_tiles_in_slice_minus1 | ue(v) |
|     if( num_tiles_in_slice_minus1 = = 0 && | |
|       RowHeight[ slice_address / NumTileColumns ] > 1) { | |
|       part_tile_in_slice_flag | |
|       if( part_tile_in_slice_flag ) { | |

TABLE 16-continued

| | Descriptor |
|---|---|
| The modified syntax table based on JVET-Q2001 according to Embodiment O | |

```
        tile__row__id                                             u(v)
      if( tile__row__id < RowHeight[ slice__address / NumTileColumns ] −
1 )
              num__rows__in__slice__ minus1                       ue(v)
          }
      }
    }
    ....
}
```

The related semantics are as follows:

slice_subpic_id specifies the subpicture ID of the subpicture that contains the slice. If slice_subpic_id is present, the value of the variable CurrSubpicIdx is derived to be such that SubpicIdVal[CurrSubpicIdx] is equal to slice_subpic_id. Otherwise (slice_subpic_id is not present), slice_subpic_id is inferred to be equal to SubpicIdVal[0] and CurrSubpicIdx is derived to be equal to 0. The length of slice_subpic_id is sps_subpic_id_len_minus1+1 bits.

slice_address specifies the slice address of the slice. When not present, the value of slice_address is inferred to be equal to 0.

If rect_slice_flag is equal to 0, the following applies:
The slice address is the raster scan tile index of the first tile in the slice.
The length of slice_address is Ceil(Log 2 (NumTilesIn-Pic)) bits.
The value of slice_address shall be in the range of 0 to NumTilesInPic−1, inclusive.
Otherwise (rect_slice_flag is equal to 1), the following applies:
The slice address is the subpicture-level slice index of the slice.
The length of slice_address is Ceil(Log 2(NumSlicesIn-Subpic[CurrSubpicIdx])) bits.
The value of slice_address shall be in the range of 0 to NumSlicesInSubpic[CurrSubpicIdx]−1, inclusive.

sh_extra_bit[i] may be equal to 1 or 0. Decoders conforming to this version of this Specification shall ignore the value of sh_extra_bit[i]. Its value does not affect decoder conformance to profiles specified in this version of specification.

num_tiles_in_slice_minus1 plus 1 specifies the number of tiles in the slice when rect_slice_flag is equal to 0. The value of num_tiles_in_slice_minus1 shall be in the range of 0 to NumTilesInPic−1−slice_address, inclusive. When rect_slice_flag is equal to 0 and num_tiles_in_slice_minus1 is not present, the value of num_tiles_in_slice_minus1 is inferred to be equal to 0.

part_tile_in_slice_flag equal to 1 specifies that the syntax elements tile_row_id and num_rows_in_slice_minus1 follow next in the slice header. part_tile_in_slice_flag equal to 0 specifies that the syntax elements tile_row_id and num_rows_in_slice_minus1 are not present in the slice header. When part_tile_in_slice_flag is not present, it is inferred to be equal to 0.

tile_row_id specifies the first CTU row index of the slice within the tile with the tile index specified by slice_address. The length of tile_row_id is Ceil(Log 2 (RowHeight [slice_address/NumTileColumns])) bits. The value of tile_row_id shall be in the range of 0 to RowHeight [slice_address/NumTileColumns]−1. When rect_slice_flag is equal to 0 and tile_row_id is not present, the value of tile_row_id is inferred to be equal to 0.

num_rows_in_slice_minus1 plus 1 specifies the number of consecutive complete CTU rows within the tile with the raster scan tile index slice_address in the slice when num_tiles_in_slice_minus1 is equal to 0. The value of num_rows_in_slice_minus1 shall be in the range of 0 to Min(RowHeight[slice_address/NumTileColumns]−2, RowHeight[slice_address/NumTileColumns]−1−tile_row_id). When part_tile_in_slice_flag is equal to 1 and num_rows_in_slice_minus1 is not present, the value of num_rows_in_slice_minus1 is inferred to be equal to 0.

It is a requirement of bitstream conformance that the following constraints apply:
If rect_slice_flag is equal to 0, the pair of slice_address and tile_row_id values shall not be equal to the pair of slice_address and tile_row_id values of any other coded slice NAL unit of the same coded picture.
Otherwise, the pair of slice_subpic_id and slice_address values shall not be equal to the pair of slice_subpic_id and slice_address values of any other coded slice NAL unit of the same coded picture.
The shapes of the slices of a picture shall be such that each CTU, when decoded, shall have its entire left boundary and entire top boundary consisting of a picture boundary or consisting of boundaries of previously decoded CTU(s).
If rect_slice_flag is equal to 0 and num_tiles_in_slice_minus1 is equal to 0, the sum of tile_row_id and num_rows_in_slice_minus1 plus 1 shall be less than or equal to RowHeight[slice_address/NumTileColumns].

The variable NumCtusInCurrSlice, which specifies the number of CTUs in the current slice, and the list CtbAddrIn-CurrSlice[i], for i ranging from 0 to NumCtusInCurrSlice−1, inclusive, specifying the picture raster scan address of the i-th CTB within the slice, are derived as follows:

```
if( rect_slice_flag ) {
    picLevelSliceIdx = slice_address
    for( j = 0; j < CurrSubpicIdx; j++ )
        picLevelSliceIdx += NumSlicesInSubpic[ j ]
    NumCtusInCurrSlice = NumCtusInSlice[ picLevelSliceIdx ]
    for( i = 0; i < NumCtusInCurrSlice; i++ )
        CtbAddrInCurrSlice[ i ] = CtbAddrInSlice[ picLevelSliceIdx ][ i ]
} else {
    NumCtusInCurrSlice = 0
    if( part_tile_in_slice_flag ) {
        tileIdx = slice_address
        tileX = tileIdx % NumTileColumns
        tileY = tileIdx / NumTileColumns
        for( i = 0, ctbY = tileRowBd[ tileY ] + tile_row_id; i <=
            num_rows_in_slice_minus1; ctbY++,
```

-continued

```
i++ ){
    for( ctbX = tileColBd[ tileX ]; ctbX < tileColBd[ tileX + 1 ];
    ctbX++ ) {
        CtbAddrInCurrSlice[ NumCtusInCurrSlice ] = ctbY *
        PicWidthInCtb + ctbX
        Num CtusInCurr Slice++
    }
    }
} else {
    for( tileIdx = slice_address; tileIdx <= slice_address +
    num_tiles_in_slice_minus1;
tileIdx++ ) {
        tileX = tileIdx % NumTileColumns
        tileY = tileIdx / NumTileColumns
        for( ctbY = tileRowBd[ tileY ]; ctbY < tileRowBd[ tileY + 1 ];
        ctbY++ ) {
            for( ctbX = tileColBd[ tileX ]; ctbX < tileColBd[ tileX + 1 ];
            ctbX++ ) {
                CtbAddrInCurrSlice[ NumCtusInCurrSlice ] = ctbY *
                PicWidthInCtb + ctbX
                NumCtusInCurrSlice++
            }
        }
    }
}
}
```

In Embodiment P, a new syntax element num_tiles_in_slice, replacing the syntax element num_tiles_in_slice_minus1 in JVET-Q2001, is coded for signaling information related to the number of the consecutive complete tiles contained in the current slice. num_tiles_in_slice equal to 0 specifies that the new syntax elements tile_row_id and num_rows_in_slice_minus1 follow next in the slice header as shown in Table 17. tile_row_id specifies the first CTU row index of the current slice in the associated tile with the raster scan tile index equal to slice_address. num_rows_in_slice_minus1 plus 1 specifies the number of the CTU rows in the current slice. When tile_row_id is equal to the last tile index of the associated tile, num_rows_in_slice_minus1 is inferred to be equal to 0 and is not explicitly signaled.

The related semantics are as follows:

slice_subpic_id specifies the subpicture ID of the subpicture that contains the slice. If slice_subpic_id is present, the value of the variable CurrSubpicIdx is derived to be such that SubpicIdVal[CurrSubpicIdx] is equal to slice_subpic_id. Otherwise (slice_subpic_id is not present), slice_subpic_id is inferred to be equal to SubpicIdVal[0] and CurrSubpicIdx is derived to be equal to 0. The length of slice_subpic_id is sps_subpic_id_len_minus1+1 bits.

slice_address specifies the slice address of the slice. When not present, the value of slice_address is inferred to be equal to 0.

If rect_slice_flag is equal to 0, the following applies:

The slice address is the raster scan tile index of the first tile in the slice.

The length of slice_address is Ceil(Log 2 (NumTilesInPic)) bits.

The value of slice_address shall be in the range of 0 to NumTilesInPic−1, inclusive.

Otherwise (rect_slice_flag is equal to 1), the following applies:

The slice address is the subpicture-level slice index of the slice.

The length of slice_address is Ceil(Log 2(NumSlicesInSubpic[CurrSubpicIdx])) bits.

The value of slice_address shall be in the range of 0 to NumSlicesInSubpic[CurrSubpicIdx]−1, inclusive.

sh_extra_bit[i] may be equal to 1 or 0. Decoders conforming to this version of this Specification shall ignore the value of sh_extra_bit[i]. Its value does not affect decoder conformance to profiles specified in this version of specification.

num_tiles_in_slice specifies the number of complete tiles in the slice when rect_slice_flag is equal to 0. The value of num_tiles_in_slice shall be in the range of 0 to NumTilesInPic−slice_address, inclusive.

tile_row_id specifies the first CTU row index of the slice within the tile with the tile index specified by slice_address. The length of tile_row_id is Ceil(Log 2 (RowHeight

TABLE 17

| The modified syntax table based on JVET-Q2001 according to Embodiment P | |
|---|---|
| | Descriptor |
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1 ) | |
| || | |
|     ( !rect_slice_flag && NumTilesInPic > 1 ) ) | |
|     slice_address | u(v) |
|   for( i = 0; i < NumExtraShBits; i++ ) | |
|     sh_extra_bit[ i ] | u(1) |
|   if( !rect_slice_flag ) { | |
|     num_tiles_in_slice | ue(v) |
|     if( num_tiles_in_slice = = 0 ) { | |
|       tile_row_id | u(v) |
|       if( tile_row_id < RowHeight[ slice_address / NumTileColumns ] − 1 ) | |
|         num_rows_in_slice_ minus1 | ue(v) |
|     } | |
|   } | |
|   .... | |
| } | |

[slice_address/NumTileColumns])) bits. The value of tile_row_id shall be in the range of 0 to RowHeight [slice_address/NumTileColumns]−1. When rect_slice_flag is equal to 0 and tile_row_id is not present, the value of tile_row_id is inferred to be equal to 0.

num_rows_in_slice_minus1 plus 1 specifies the number of consecutive complete CTU rows within the tile with the raster scan tile index slice_address in the slice when num_tiles_in_slice_minus1 is equal to 0. The value of num_rows_in_slice_minus1 shall be in the range of 0 to Min(RowHeight[slice_address/NumTileColumns]−2, RowHeight[slice_address/NumTileColumns]−1− tile_row_id). When part_tile_in_slice_flag is equal to 1 and num_rows_in_slice_minus1 is not present, the value of num_rows_in_slice_minus1 is inferred to be equal to 0.

It is a requirement of bitstream conformance that the following constraints apply:

If rect_slice_flag is equal to 0, the pair of slice_address and tile_row_id values shall not be equal to the pair of slice_address and tile_row_id values of any other coded slice NAL unit of the same coded picture.

Otherwise, the pair of slice_subpic_id and slice_address values shall not be equal to the pair of slice_subpic_id and slice_address values of any other coded slice NAL unit of the same coded picture.

The shapes of the slices of a picture shall be such that each CTU, when decoded, shall have its entire left boundary and entire top boundary consisting of a picture boundary or consisting of boundaries of previously decoded CTU(s).

If rect_slice_flag is equal to 0 and num_tiles_in_slice_minus1 is equal to 0, the sum of tile_row_id and num_rows_in_slice_minus1 plus 1 shall be less than or equal to RowHeight[slice_address/NumTileColumns].

The variable NumCtusInCurrSlice, which specifies the number of CTUs in the current slice, and the list CtbAddrIn-CurrSlice[i], for i ranging from 0 to NumCtusInCurrSlice−1, inclusive, specifying the picture raster scan address of the i-th CTB within the slice, are derived as follows:

```
if( rect_slice_flag) {
    picLevelSliceIdx = slice_address
    for( j = 0; j < CurrSubpicIdx; j++ )
        picLevelSliceIdx += NumSlicesInSubpic[ j ]
    NumCtusInCurrSlice = NumCtusInSlice[ picLevelSliceIdx ]
    for( i = 0; i < NumCtusInCurrSlice; i++ )
        CtbAddrInCurrSlice[ i ] = CtbAddrInSlice[ picLevelSliceIdx][ i ]
} else {
    NumCtusInCurrSlice = 0
    if( num_tiles_in_slice = = 0 ) {
        tileIdx = slice_address
        tileX = tileIdx % NumTileColumns
        tileY = tileIdx / NumTileColumns
        for( i = 0, ctbY = tileRowBd[ tileY ] + tile_row_id; i <=
```

-continued

```
            num_rows_in_slice_ minus1; ctbY++,
i++){
            for( ctbX = tileColBd[ tileX ]; ctbX < tileColBd[ tileX + 1 ];
            ctbX++) {
                CtbAddrInCurrSlice[ NumCtusInCurrSlice ] = ctbY *
                PicWidthInCtb + ctbX
                NumCtusInCurrSlice++
            }
        }
    } else {
        for( tileIdx = slice_address; tileIdx <= slice_address +
        num_tiles_in_slice_minus1;
tileIdx++ ) {
            tileX = tileIdx % NumTileColumns
            tileY = tileIdx / NumTileColumns
            for( ctbY = tileRowBd[ tileY ]; ctbY < tileRowBd[ tileY + 1 ];
            ctbY++ ) {
                for( ctbX = tileColBd[ tileX ]; ctbX < tileColBd[ tileX + 1 ];
                ctbX++ ) {
                    CtbAddrInCurrSlice [ NumCtusInCurrSlice ] = ctbY *
                    PicWidthInCtb + ctbX
                    NumCtusInCurrSlice++
                }
            }
        }
    }
}
```

The proposed method may have a requirement of bit-stream conformance that the order of the VCL NAL units within a coded picture is constrained as follows:

For any two coded slice NAL units A and B of a coded picture, let SubpicIdVal[subpicIdxA] and SubpicIdVal [subpicIdxB] be their slice_subpic_id values, sliceAddrA and sliceddrB be their slice_address values, and tileRowIdA and tileRowIdB be their tile_row_id values.

When any of the following conditions is true, coded slice NAL unit A shall precede coded slice NAL unit B:

subpicIdxA is less than subpicIdxB.

subpicIdxA is equal to subpicIdxB and sliceAddrA is less than sliceAddrB.

rect_slice_flag is equal to 0, subpicIdxA is equal to subpicIdxB, sliceAddrA is equal to sliceAddrB, and tileRowIdA is less than tileRowIdB.

According to another aspect of the present disclosure, when the current slice is entirely contained within a tile, the proposed method may signal information for deriving the position of the slice and the number of consecutive CTU rows within the tile right after signaling the tile address of the slice or before signaling extra bits in the slice headers (related to the syntax sh_extra_bit). In this way, the related information for deriving slice partitioning for the current slice can be encoded or decoded together at the beginning of slice header. In Embodiment Q as an example, we further modify Embodiment M according to the proposed method with the modified syntax table provided in Tables 18.

TABLE 18

| The modified syntax table based on JVET-Q2001 according to Embodiment Q | |
|---|---|
| | Descriptor |
| slice_header( ) { | |
| picture_header_in_slice_header_flag | u(1) |
| if( picture_header_in_slice_header_flag ) | |
| picture_header_structure( ) | |
| if( subpic_info_present_flag ) | |

TABLE 18-continued

The modified syntax table based on JVET-Q2001 according to Embodiment Q

| | Descriptor |
|---|---|
| slice_subpic_id | u(v) |
| if( ( rect_slice_flag && NumSlicesInSubpic[ CurrSubpicIdx ] > 1 ) | |
| \| \| | |
| ( !rect_slice_flag && NumTilesInPic > 1 ) ) | |
| slice_address | u(v) |
| if( !rect_slice_flag ) { | |
| if( slice_address < NumTilesInPic − 1 ) | |
| num_tiles_in_slice_minus1 | ue(v) |
| if( num_tiles_in_slice_minus1 = = 0 && | |
| RowHeight[ slice_address / NumTileColumns ] > 1) { | |
| num_rows_in_slice | u(v) |
| if( num_rows_in_slice ) | |
| tile_row_id | ue(v) |
| } | |
| } | |
| for( i = 0; i < NumExtraShBits; i++ ) | |
| sh_extra_bit[ i ] | u(1) |
| ... | |
| } | |

According to another aspect of the present disclosure, a video coder may further signal one or more syntax elements in one or more high-level syntax sets such as the sequence parameter set (SPS), the picture parameter set (PPS), and the picture header (PH), to indicate whether to allow more than one slice contained in one tile in a coded picture. When the said one or more high-level syntax elements indicate that it is not allowed to have more than one slice contained in one tile, for each slice that is contained within a tile, the video coder may skip coding information for deriving the position and size of the slice within the tile for saving bit costs. When a current slice is contained within a tile, it is inferred that the slice contains the complete tile.

In Embodiment R as an example, we further modify Embodiment Q according to the proposed method with modified syntax tables provided in Tables 19 and 20 for the PPS and the slice header, respectively. A new syntax element multiple_slices_in_tile_enabled_flag is further signaled in the PPS. multiple_slices_in_tile_enabled_flag equal to 1 indicates that one or more slices may be contained in a tile in the picture. multiple_slices_in_tile_enabled_flag equal to 0 indicates that no more than one slice shall be contained in any one of the tiles in the picture. When multiple_slices_in_tile_enabled_flag is equal to 0, the syntax elements num_rows_in_slice and tile_row_id in the slice header in the raster-scan slice mode (rect_slice_flag=0) or the syntax elements num_exp_slices_in_tile and exp_slice_height_in_ctus_minus1 in the PPS in the rectangular slice mode (rect_slice_flag=1) are not coded. Alternatively, we can signal rect_slice_flag before signaling multiple_slices_in_tile_enabled_flag. multiple_slices_in_tile_enabled_flag is signaled only when rect_slice_flag is equal to 0 and more than one slice in a tile is always allowed in the rectangular slice mode. In the proposed method, more than one slice in one tile is further supported in the raster-scan slice mode. Therefore, both rectangular slice mode and the raster-scan slice mode can be selected for coding a picture with one tile. We may signal the syntax element rect_slice_flag without conditioning on if NumTilesInPic is greater than 1. Or we may signal rect_slice_flag conditioned on whether NumTilesInPic is greater than 1 or multiple_slices_in_tile_enabled_flag is equal to 1.

TABLE 19

The modified syntax table for the PPS based
on JVET-Q2001 according to Embodiment R

| | Descriptor |
|---|---|
| pic_parameter_set_rbsp( ) { | |
| pps_pic_parameter_set_id | ue(v) |
| .... | |
| no_pic_partition_flag | u(1) |
| if( !no_pic_partition_flag ) { | |
| pps_log2_ctu_size_minus5 | u(2) |
| num_exp_tile_columns_minus1 | ue(v) |
| num_exp_tile_rows_minus1 | ue(v) |
| for( i = 0; i <= num_exp_tile_columns_minus1; i++ ) | |
| tile_column_width_minus1[ i ] | ue(v) |
| for( i = 0; i <= num_exp_tile_rows_minus1; i++ ) | |
| tile_row_height_minus1[ i ] | ue(v) |
| multiple_slices_in_tile_enabled_flag | u(1) |
| if( NumTilesInPic >1 \| \| multiple_slices_in_tile_enabled_flag ) | |
| rect_slice_flag | u(1) |
| if( rect_slice_flag ) | |

TABLE 19-continued

The modified syntax table for the PPS based
on JVET-Q2001 according to Embodiment R

| | Descriptor |
|---|---|
| single_slice_per_subpic_flag | u(1) |
| if( rect_slice_flag && !single_slice_per_subpic_flag ) { | |
| num_slices_in_pic_minus1 | ue(v) |
| if( num_slices_in_pic_minus1 > 0 ) | |
| tile_idx_delta_present_flag | u(1) |
| for( i = 0; i < num_slices_in_pic_minus1; i++ ) { | |
| if( NumTileColumns > 1 ) | |
| slice_width_in_tiles_minus1[ i ] | ue(v) |
| if( NumTileRows > 1 && ( tile_idx_delta_present_flag \|\| | |
| SliceTopLeftTileIdx[ i ] % NumTileColumns = = 0 ) ) | |
| slice_height_in_tiles_minus1[ i ] | ue(v) |
| if( slice_width_in_tiles_minus1[ i ] = = 0 && | |
| slice_height_in_tiles_minus1[ i ] = = 0 && | |
| RowHeight[ SliceTopLeftTileIdx[ i ] / NumTileColumns ] > 1 | |
| && multiple_slices_in_tile_enabled_flag ) { | |
| num_exp_slices_in_tile[ i ] | ue(v) |
| for( j = 0; j < num_exp_slices_in_tile[ i ]; j++ ) | |
| exp_slice_height_in_ctus_minus1[ i ][ j ] | ue(v) |
| i += NumSlicesInTile[ i ] − 1 | |
| } | |
| if( tile_idx_delta_present_flag && i < | |
| num_slices_in_pic_minus1 ) | |
| tile_idx_delta[ i ] | se(v) |
| } | |
| } | |
| .... | |
| } | |

TABLE 20

The modified syntax table for the slice header
based on JVET-Q2001 according to Embodiment R

| | Descriptor |
|---|---|
| slice_header( ) { | |
| picture_header_in_slice_header_flag | u(1) |
| if( picture_header_in_slice_header_flag ) | |
| picture_header_structure( ) | |
| if( subpic_info_present_flag ) | |
| slice_subpic_id | u(v) |
| if( ( rect_slice_flag && NumSlicesInSubpic[ CurrSubpicIdx ] > 1 ) | |
| \|\| | |
| ( !rect_slice_flag && NumTilesInPic > 1 ) ) | |
| slice_address | u(v) |
| if( !rect_slice_flag ) { | |
| if( slice_address < NumTilesInPic − 1 ) | |
| num_tiles_in_slice_minus1 | ue(v) |
| if( num_tiles_in_slice_minus1 = = 0 && | |
| RowHeight[ slice address / NumTileColumns ] > 1 | |
| && multiple_slices_in_tile_enabled_flag ) { | |
| num_rows_in_slice | u(v) |
| if( num_rows_in_slice ) | |
| tile_row_id | ue(v) |
| } | |
| } | |
| for( i = 0; i < NumExtraShBits; i++ ) | |
| sh_extra_bit[ i ] | u(1) |
| .... | |
| } | |

The related semantics are as follows:

multiple_slices_in_tile_enabled_flag equal to 1 specifies that one or more slices may be contained in a tile for each coded picture referring to the PPS. multiple_slices_in_tile_enabled_flag equal to 0 specifies that no more than one slice shall be contained in any tile for each coded picture referring to the PPS. When multiple_slices_in_tile_enabled_flag is not present, it is inferred to be equal to 0.

According to another aspect of the present disclosure, a video coder may signal one or more syntax elements in one or more high-level syntax sets such as the sequence parameter set (SPS), the picture parameter set (PPS), and the picture header (PH), to indicate that each slice contains exactly one complete tile in the coded picture. When the said one or more syntax elements indicate that each slice contains exactly one complete tile in the coded picture, the video coder may skip coding information for deriving slice partitioning for the coded picture and further save bit costs. The resulted slice partitioning for the coded picture is inferred to be the same as the tile partitioning for the coded picture.

In Embodiment S as an example, Embodiment R is further modified according to the proposed method with the modified syntax table provided in Tables 21 for the PPS. A new syntax element single_slice_per_tile_flag is further signaled in the PPS. single_slice_per_tile_flag equal to 1 specifies that each slice consists of one and only one complete tile for each coded picture referring to the PPS. single_slice_per_tile_flag equal to 0 specifies that each slice may consist of one or more complete tile or be entirely contained within a tile for each coded picture referring to the PPS. When single_slice_per_tile_flag is equal to 0, the slice partitioning of the picture is not coded and is derived from the tile partitioning of the picture.

TABLE 21

| The modified syntax table based on JVET-Q2001 according to Embodiment S | |
| --- | --- |
| | Descriptor |
| pic_parameter_set_rbsp( ) { | |
|   pps_pic_parameter_set_id | ue(v) |
|   .... | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     rect_slice_flag | u(1) |
|     if( rect_slice_flag ) { | |
|       single_slice_per_subpic_flag | u(1) |
|       if( !single_slice_per_subpic_flag ) { | |
|         single_slice_per_tile_flag | u(1) |
|         if( !single_slice_per_tile_flag ) { | |
|           num_slices_in_pic_minus1 | ue(v) |
|           if( num_slices_in_pic_minus1 > 0 ) { | |
|             tile_idx_delta_present_flag | u(1) |
|             multiple_slices_in_tile_enabled_flag | u(1) |
|           } | |
|           for( i = 0; i < num_slices_in_pic_minus1; i++ ) { | |
|             if( NumTileColumns > 1 ) | |
|               slice_width_in_tiles_minus1[ i ] | ue(v) |
|             if( NumTileRows > 1 && ( tile_idx_delta_present_flag || | |
|               SliceTopLeftTileIdx[ i ] % NumTileColumns = = 0 ) ) | |
|               slice_height_in_tiles_minus1[ i ] | ue(v) |
|             if( slice_width_in_tiles_minus1[ i ] = = 0 && | |
|               slice_height_in_tiles_minus1[ i ] = = 0 && | |
|               RowHeight[ SliceTopLeftTileIdx[ i ] / NumTileColumns ] > 1 | |
|               && multiple_slices_in_tile_enabled_flag ) { | |
|               num_exp_slices_in_tile[ i ] | ue(v) |
|               for( j = 0; j < num_exp_slices_in_tile[ i ]; j++ ) | |
|                 exp_slice_height_in_ctus_minus1[ i ][ j ] | ue(v) |
|               i += NumSlicesInTile[ i ] – 1 | |
|             } | |
|             if( tile_idx_delta_present_flag && i < num_slices_in_pic_minus1 ) | |
|               tile_idx_delta[ i ] | se(v) |
|           } | |
|         } | |
|       } | |
|     } else | |
|       multiple_slices_in_tile_enabled_flag | u(1) |
|     loop_filter_across_tiles_enabled_flag | u(1) |
|     loop_filter_across_slices_enabled_flag | u(1) |
|   } | |
|   .... | |
| } | |

The related semantics are as follows:

single_slice_per_tile_flag equal to 1 specifies that each slice consists of one and only one complete tile for each coded picture referring to the PPS. single_slice_per_tile_f-lag equal to 0 specifies that each slice may consist of one or more complete tile or be entirely contained within a tile for each coded picture referring to the PPS. When single_sli-ce_per_tile_flag is not present, it is inferred to be equal to 0.

When rect_slice_flag is equal to 1, the list NumCtusIn-Slice[i] for i ranging from 0 to num_slices_in_pic_minus1, inclusive, specifying the number of CTUs in the i-th slice, the list SliceTopLeftTileIdx[i] for i ranging from 0 to num_slices_in_pic_minus1, inclusive, specifying the tile index of the tile containing the first CTU in the slice, and the matrix CtbAddrInSlice[i][j] for i ranging from 0 to num_slices_in_pic_minus1, inclusive, and j ranging from 0 to NumCtusInSlice[i]−1, inclusive, specifying the picture raster scan address of the j-th CTB within the i-th slice, and the variable NumSlicesInTile[i], specifying the number of slices in the tile containing the i-th slice, are derived as follows:

```
if( single_slice_per_subpic_flag) {
    for( i = 0; i <= sps_num_subpics_minus1; i++ ) {
        NumCtusInSlice[ i ] = 0
        if( subpicHeightLessThanOneTileFlag[ i ]) /* The slice consists of
a number of CTU rows in a tile. */
            AddCtbsToSlice( i, subpic_ctu_top_left_x[ i ],
                subpic_ctu_top_left_x[ i ] + subpic_width_minus1[ i ] + 1,
                subpic_ctu_top_left_y[ i ],
                subpic_ctu_top_left_y[ i ] + subpic_height_minus1[ i ] + 1 )
        else {/* The slice consists of a number of complete tiles covering
        a rectangular region. */
            tileX = CtbToTileColBd[ subpic_ctu_top_left_x[ i ] ]
            tileY = CtbToTileRowBd[ subpic_ctu_top_left_y[ i ] ]
            for( j = 0; j < SubpicHeightInTiles[ i ]; j++ )
                for( k = 0; k < SubpicWidthInTiles[ i ]; k++ )
                    AddCtbsToSlice( i, tileColBd[ tileX + k ], tileColBd[
                    tileX + k + 1 ],
tileRowBd[ tileY +j ],
                        tileRowBd[ tileY + j + 1 ] )
        }
    }
} else if( single_slice_per_tile_flag ) {
    for( i = 0, tileY = 0; tileY < NumTileRows; tileY++ )
        for( tileX = 0; tileX < NumTileColumns; tileX++ ) {
            AddCtbsToSlice( i, tileColBd[ tileX ], tileColBd[ tileX + 1 ],
                tileRowBd[ tileY ], tileRowBd[ tileY + 1 ] )
            i++
        }
} else {
tileIdx = 0
for( i = 0; i <= num_slices_in_pic_minus1; i++ )
    NumCtusInSlice[ i ] = 0
for( i = 0; i <= num_slices_in_pic_minus1; i++ ) {
    SliceTopLeftTileIdx[ i ] = tileIdx
    tileX = tileIdx % NumTileColumns
    tileY = tileIdx / NumTileColumns
    if( i < num_slices_in_pic_minus1 ) {
        sliceWidthInTiles[ i ] = slice_width_in_tiles_minus1[ i ] + 1
        sliceHeightInTiles[ i ] = slice_height_in_tiles_minus1[ i ] + 1
    } else {
        sliceWidthInTiles[ i ] = NumTileColumns − tileX
        sliceHeightInTiles[ i ] = NumTileRows − tileY
        NumSlicesInTile[ i ] = 1
    }
    if( slicWidthInTiles[ i ] = = 1 && sliceHeightInTiles[ i ] = = 1 ) {
        if( num_exp_slices_in_tile[ i ] = = 0 ) {
            NumSlicesInTile[ i ] = 1
            sliceHeightInCtus[ i ] = RowHeight[ SliceTopLeftTileIdx[
            i ] / NumTileColumns ]
        } else {
            remainingHeightInCtbsY = RowHeight[ SliceTopLeftTileIdx[
            i ] / NumTileColumns ]
            for( j = 0; j < num_exp_slices_in_tile[ i ] − 1; j++ ) {
                sliceHeightInCtus[ i + j ] =
                    exp_slice_height_in_ctus_minus1[ i ][ j ] + 1
```

-continued

```
                remainingHeightInCtbsY −= sliceHeightInCtus[ i + j ]
            }
            uniformSliceHeight = exp_slice_height_in_ctus_minus1[ i ][
            j ] + 1
            while( remainingHeightInCtbsY >= uniformSliceHeight ) {
                sliceHeightInCtus[ i + j ] = uniformSliceHeight
                remainingHeightInCtbsY −= uniformSliceHeight
                j++
            }
            if( remainingHeightInCtbsY > 0 ) {
                sliceHeightInCtus[ i + j ] = remainingHeightInCtbsY
                j++
            }
            NumSlicesInTile[ i ] = j
        }
        ctbY = tileRowBd[ tileY ]
        for(j = 0; j < NumSlicesInTile[ i ]; j++ ) {
            AddCtbsToSlice( i + j, tileColBd[ tileX ], tileColBd[ tileX + 1 ],
                ctbY, ctbY + sliceHeightInCtus[ i + j ])
            ctbY += sliceHeightInCtus[ i +j ]
        }
        i += NumSlicesInTile[ i ] − 1
    } else
        for( j = 0; j < sliceHeightInTiles[ i ]; j++ )
            for( k = 0; k < sliceWidthInTiles[ i ]; k++ )
                AddCtbsToSlice( i, tileColBd[ tileX + k ], tileColBd[
                tileX + k + 1 ],
                    tileRowBd[ tileY + j ], tileRowBd[ tileY + j + 1 ])
    if( i < num_slices_in_pic_minus1 ) {
        if( tile_idx_delta_present_flag )
            tileIdx += tile idx delta[ i ]
        else {
            tileIdx += sliceWidthInTiles[ i ]
            if( tileIdx % NumTileColumns = = 0 )
                tileIdx += ( sliceHeightInTiles[ i ] − 1 ) *
                NumTileColumns
        }
    }
}
}
```

Where the function AddCtbsToSlice(sliceIdx, startX, stopX, startY, stopY) is specified as follows:

```
for( ctbY = startY; ctbY < stopY; ctbY++)
    for( ctbX = startX; ctbX < stopX; ctbX++ ) {
        CtbAddrInSlice[ sliceIdx ][ NumCtusInSlice[ sliceIdx ] ] = ctbY *
        PicWidthInCtbsY + ctbX
        NumCtusInSlice[ sliceIdx ]++
    }
```

Any of the foregoing proposed methods can be implemented in encoders and/or decoders. For example, any of the proposed methods can be implemented in a high-level syntax encoding module an encoder, and/or a high-level syntax decoding module of a decoder. Alternatively, any of the proposed methods can be implemented as a circuit integrated to the high-level syntax encoding module of the encoder and/or the high-level syntax decoding module of the decoder. Any of the foregoing proposed methods can also be implemented in image encoders and/or decoders, wherein the resulting bitstream corresponds to one coded frame only using intra-picture prediction.

FIG. 5 illustrates a flowchart of an exemplary video decoding system according to an embodiment of the present invention, where a syntax related to a number of tiles in a target slice is parsed if the address of the target slice does not correspond to a last tile index of the current picture and the raster-scan slice mode is used for picture partition. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, a video bitstream comprising a current picture is received in step 510. Picture partition information is parsed from the video bitstream in step 520, wherein the current picture is partitioned into one or more slices and one or more tiles according to the picture partition information. A syntax related to a number of tiles in a target slice is parsed if an address of the target slice does not correspond to a last tile index of the current picture and a raster-scan slice mode is used for picture partition in step 530. Partition structure of the target slice is determined using the syntax in step 540.

A flowchart of an exemplary video encoding system corresponding to the decoder in FIG. 5 can be derived accordingly.

FIG. 6 illustrates a flowchart of another exemplary video decoding system according to an embodiment of the present invention, where a control syntax is parsed only if the picture partition information indicates more than one tile existing in the current picture. The control syntax indicates whether in-loop filtering is applied across tile boundaries. According to this method, a video bitstream comprising a current picture is received in step 610. Picture partition information is parsed from the video bitstream in step 620. A control syntax is parsed only if the picture partition information indicates more than one tile existing in the current picture in step 630. A reconstructed picture is derived from the video bitstream in step 640, wherein the reconstructed picture comprises picture partition according to the picture partition information. In-loop filtering is applied across tile boundaries if the picture partition information indicates multiple tiles existing in the current picture and the control syntax indicates the in-loop filtering being enabled in step 650.

A flowchart of an exemplary video encoding system corresponding to the decoder in FIG. 6 can be derived accordingly.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for decoding a video sequence, the method comprising:
   receiving a video bitstream comprising a current picture;
   parsing picture partition information from the video bitstream;
   parsing a control syntax only if a variable in the picture partition information indicates more than one tile existing in the current picture, wherein the variable is derived from numbers of rows and columns of the tiles in the current picture;
   deriving a reconstructed picture from the video bitstream, wherein the reconstructed picture comprises a picture partition according to the picture partition information; and
   applying in-loop filtering across tile boundaries when the picture partition information indicates multiple tiles existing in the current picture and the control syntax indicates the in-loop filtering across tile boundaries being enabled.

2. The method of claim 1, wherein the control syntax is in PPS (Picture Parameter Set) level of the video bitstream.

3. A method for encoding a video sequence, the method comprising:
   receiving input data corresponding to a current picture;
   partitioning the current picture into one or more slices and/or one or more tiles;
   signaling picture partition information in a video bitstream, wherein the picture partition information comprises a variable indicating more than one tile existing in the current picture, wherein the variable is derived from numbers of rows and columns of the tiles in the current picture;
   signaling a control syntax only when more than one tile exists in the current picture; and applying in-loop filtering across tile boundaries when more than one tile exists in the current picture and the control syntax indicates the in-loop filtering across tile boundaries being enabled.

4. The method of claim 3, wherein the control syntax is in PPS (Picture Parameter Set) level of the video bitstream.

\* \* \* \* \*